United States Patent
Cai et al.

(10) Patent No.: US 9,651,316 B2
(45) Date of Patent: May 16, 2017

(54) THERMAL ENERGY EXCHANGER FOR BATHING SHOWER WATER

(71) Applicants: Ying Lin Cai, Guangdong (CN); Chao Fou Hsu, Kaohsiung (TW)

(72) Inventors: Ying Lin Cai, Guangdong (CN); Chao Fou Hsu, Kaohsiung (TW)

(*) Notice: Subject to any disclaimer, the term of this patent is extended or adjusted under 35 U.S.C. 154(b) by 72 days.

(21) Appl. No.: 14/847,633

(22) Filed: Sep. 8, 2015

(65) Prior Publication Data

US 2016/0076230 A1    Mar. 17, 2016

Related U.S. Application Data

(60) Provisional application No. 62/049,050, filed on Sep. 11, 2014.

(51) Int. Cl.
   *A47K 3/022* (2006.01)
   *F28F 3/12* (2006.01)
   *E03C 1/00* (2006.01)

(52) U.S. Cl.
   CPC ............. *F28F 3/12* (2013.01); *E03C 1/00* (2013.01); *E03C 2001/005* (2013.01)

(58) Field of Classification Search
   CPC ...... F28F 3/12; F28F 3/14; E03C 1/00; E03C 2001/005
   USPC ............................................................. 4/598
   See application file for complete search history.

(56) References Cited

U.S. PATENT DOCUMENTS

| | | | |
|---|---|---|---|
| 4,291,423 A | 9/1981 | Wilson | |
| 4,300,247 A * | 11/1981 | Berg | A47K 3/28 165/66 |
| 4,304,292 A | 12/1981 | Cardone et al. | |
| 4,821,793 A | 4/1989 | Sheffield | |
| 8,104,532 B2 * | 1/2012 | Cardone | F28D 1/035 165/48.1 |
| 8,973,178 B2 * | 3/2015 | Rusch | A47K 3/40 4/598 |
| 9,243,853 B2 * | 1/2016 | Velan | F28F 9/00 |

* cited by examiner

*Primary Examiner* — Huyen Le
(74) *Attorney, Agent, or Firm* — Bacon & Thomas, PLLC

(57) ABSTRACT

The present invention provides a thermal energy exchanger for bathing shower water comprising an upper deck, a lower chassis and two hatches. The upper deck features creased top surface, multiple parallel septa and plural heat conducting ribs being created between each pair of adjacent septa. After having assembled, the circulation of internal water tunnel is configured into a continual zigzag duct to increase energy saving effect in consequence of improvement in heat exchanging efficiency of the water heater. With simple structure, it is easily fabricated by traditional extruding method without welding process and related welding technician. Thereby, selling price is reduced with marketing competitiveness because overall manufacturing cost is decreased so that the purchasing intention of the consumers is spurred. Thus, it is not only favorable to promote and penetrate marketing range and depth but also valuable to achieve energy saving and carbon reducing effect.

12 Claims, 28 Drawing Sheets

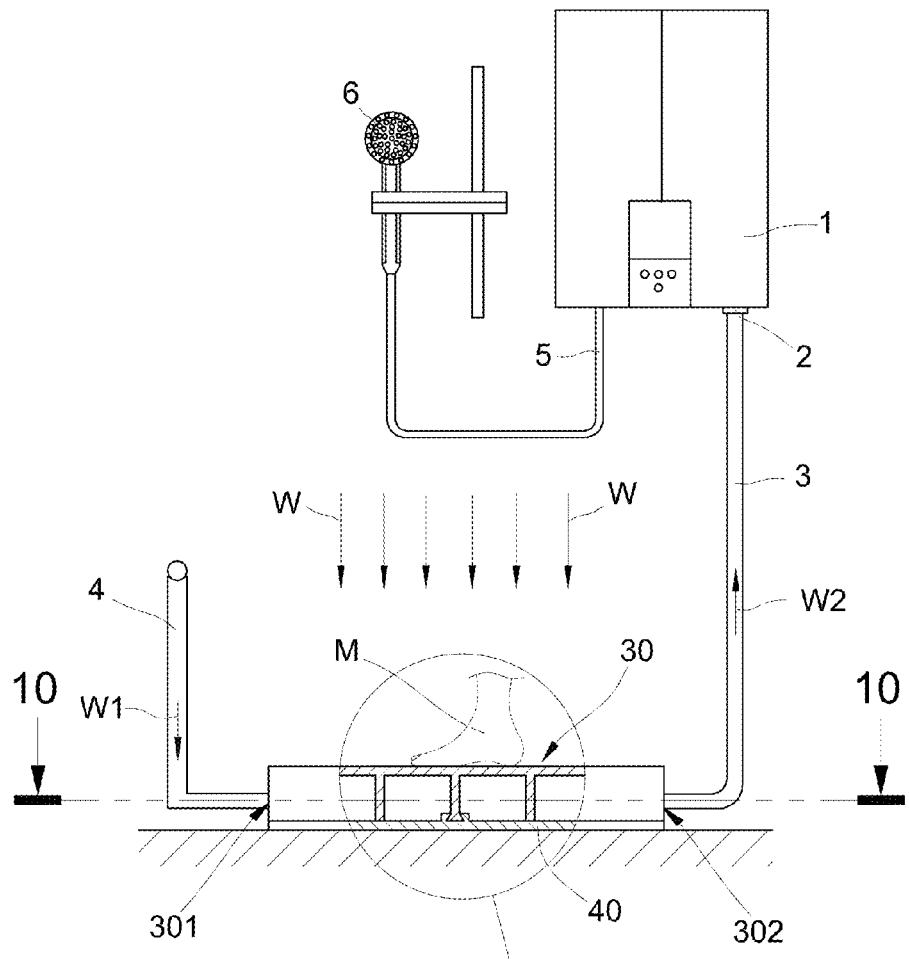
*Fig.9* (Prior Art)
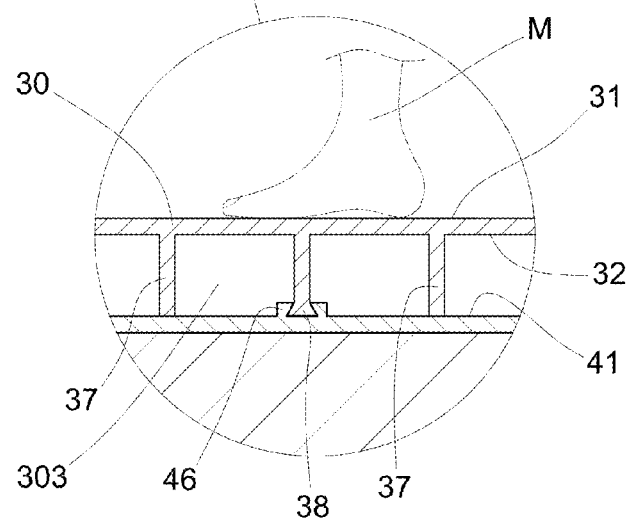

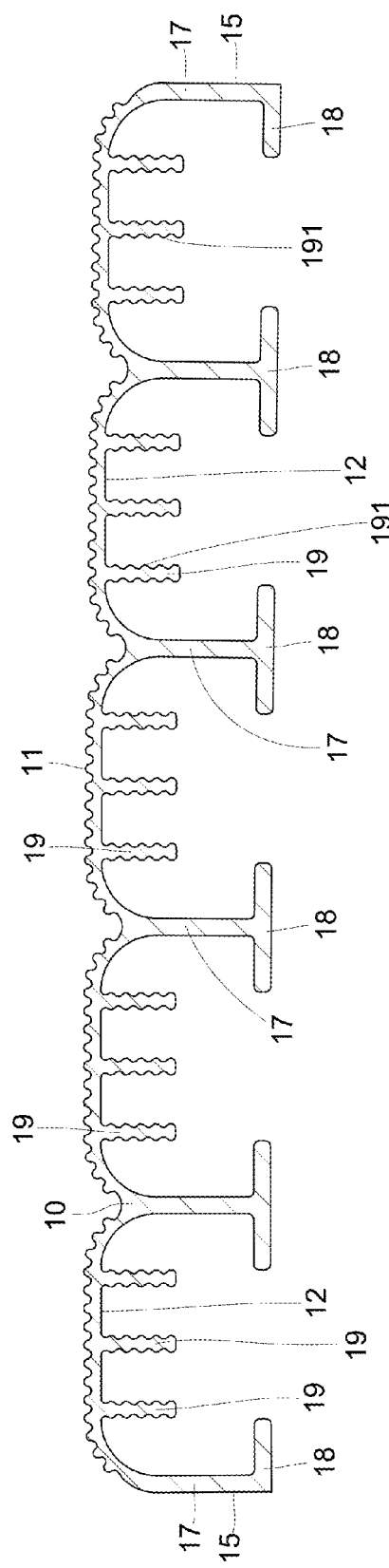
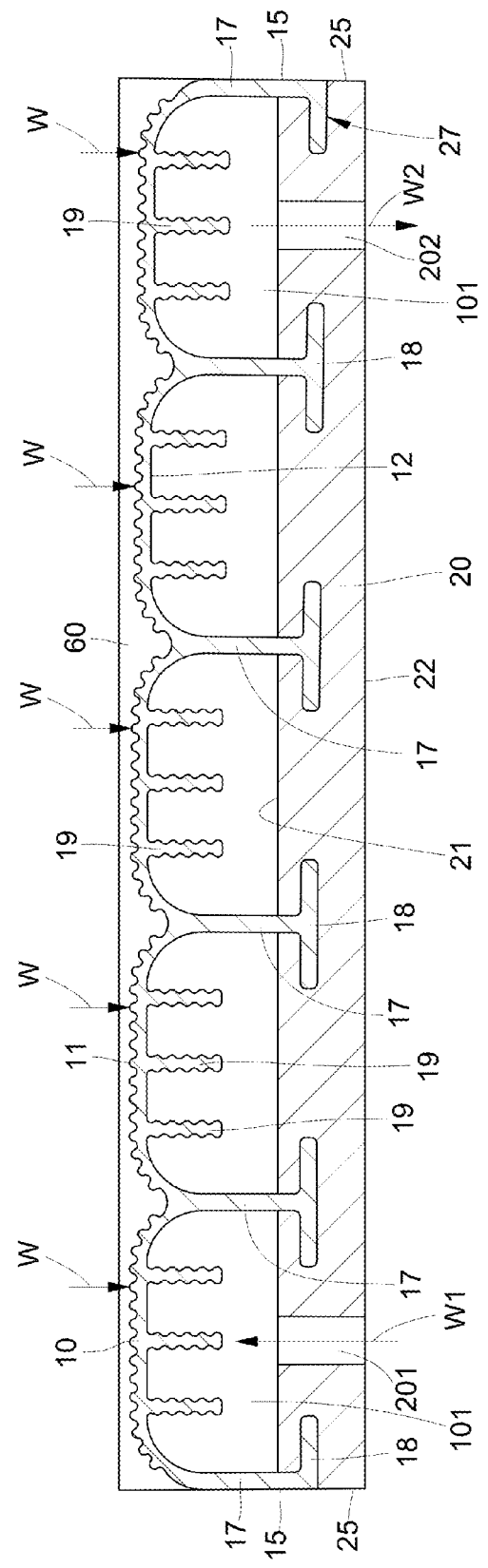
Fig.21
Fig.22

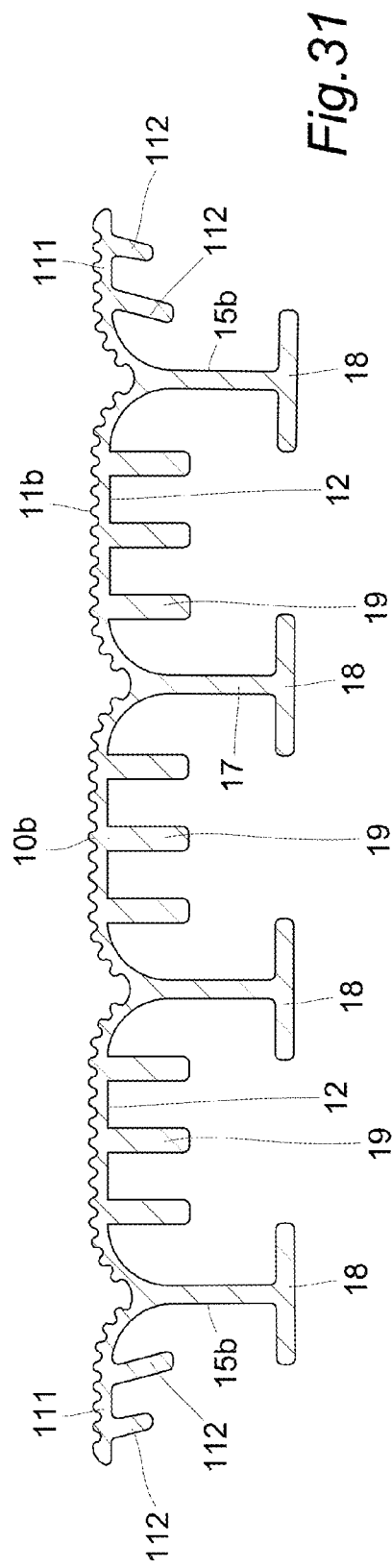
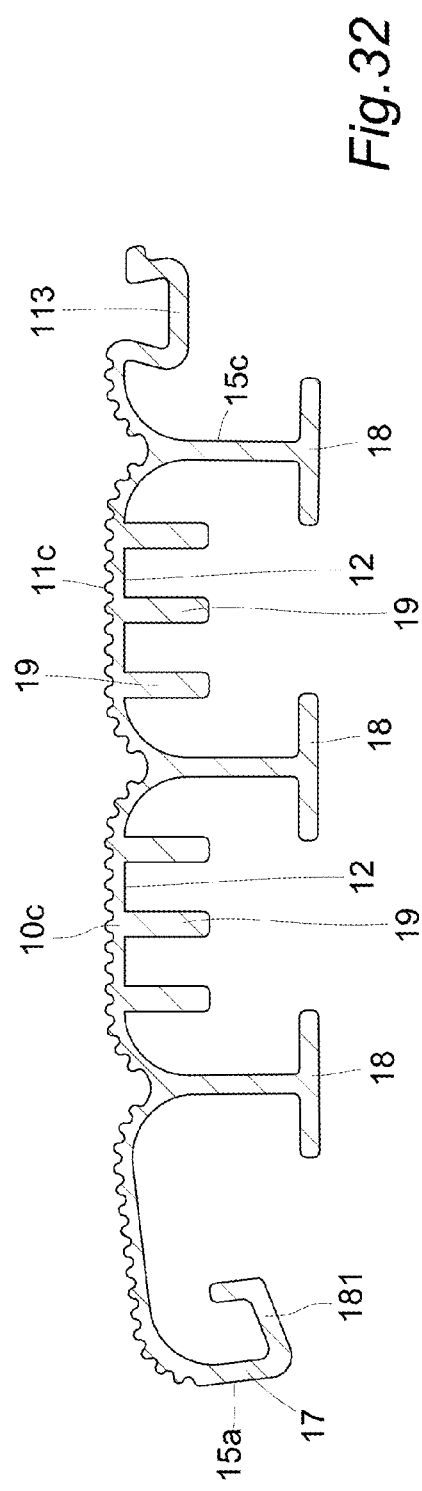

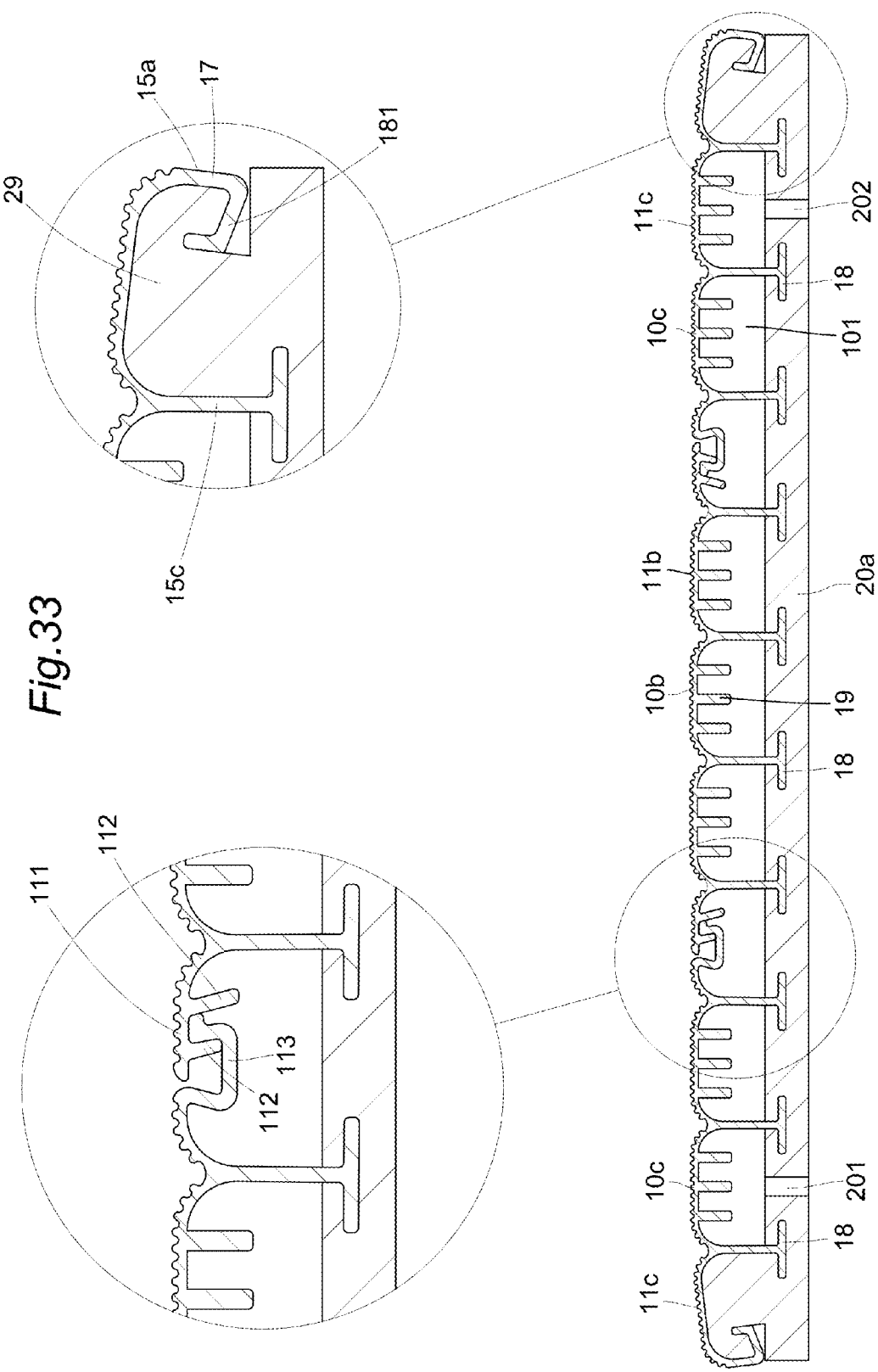

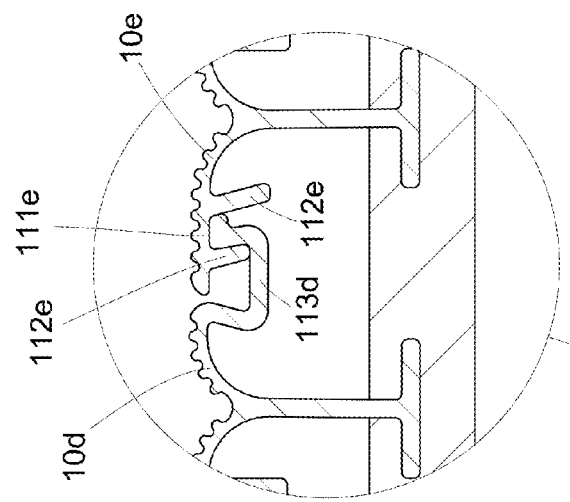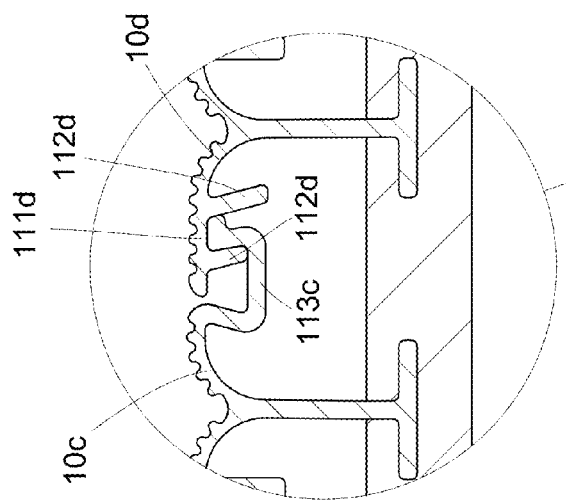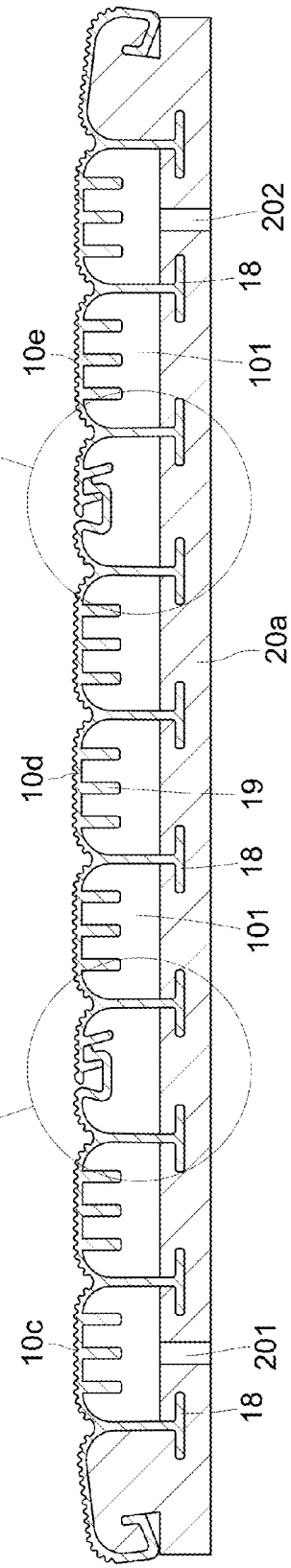
Fig.36

THERMAL ENERGY EXCHANGER FOR BATHING SHOWER WATER

This application claims the benefit of provisional U.S. Patent Application No. 62/049,050, filed Sep. 11, 2014, and incorporated herein by reference.

FIELD OF THE PRESENT INVENTION

The present invention relates to a thermal energy exchanger for bathing shower water with "recovering rate for the residual heat in spent shower water" thereof over 50% other than that the consumed energy quantity of the electricity or gas can be considerably reduced so that manufacturing cost is decreased and energy saving efficiency is increased. Thereby, the purchasing intention of the consumers is spurred and energy saving and carbon reducing effects is promoted.

BACKGROUND OF THE INVENTION

The inventor applied a Chinese Invention Patent in title of "heat exchanger for bathing shower" with filing number of 20101055693.1 at Nov. 24, 2010, which is also announced in publishing number of CN102478367 at Feb. 12, 2014. The conventional "heat exchanger for bathing shower" comprises a stacked upper deck 30 and a founded lower chassis 40 as well as a front hatch 50 and a rear hatch 50 as shown in FIGS. 1 through 8, wherein said upper deck 30, which is a planiform cuboid extruded by metal material and encompassed by a flat top surface 31, a bottom surface 32, a front side 33, a rear side 34, a pair of parallel flanks 35, includes a plurality of screw bores 36 created in the front side 33 and rear side 34 respectively, several parallel septa 37 downwardly disposed on the bottom surface 32 such that a water passage 303 is created between each pair of adjacent septa 37, an upper docking latch bar 38 in male dovetail cross section being downwardly formed on the terminal of one septum 37, a circulating bore 39 being created on each septum 37 in interlaced stagger manner, which means a circulating bore 39 in upper section of one septum 37 and another circulating bore 39 in lower section of the other septum 37 for each pair of adjacent septa 37, so that all the adjacent water passages 303 can be mutually communicable as a continual zigzag circulating duct even being separated by a septum 37 between them, a water intake 301 is created in one flank 35 while a water outtake 302 is created in the other opposed flank 35 respectively; said lower chassis 40, which is a planiform slab extruded by metal material and encompassed by a top surface 41, a sole surface 42, a front side 43, a rear side 44, a pair of parallel flanks 45 with same planar shape and area in mating with the upper deck 30, includes a plurality of screw bores 47 created in the front side 43 and rear side 44 respectively, and a lower docking latch bar 46 in female dovetail cross section, which is upwardly formed on the top surface 41 in a suitable position corresponding to the upper docking latch bar 38 of the specific septum 37 on the upper deck 30 so that the male dovetailed upper docking latch bar 38 and the corresponding female dovetailed lower docking latch bar 46 can be securely engaged in mutual latch manner; and each hatch 50, which is a planiform slab with suitable planar shape and area to properly cover an interim integral assembly of the upper deck 30 and lower chassis 40 in flush manner, has a plurality of punched holes 51 disposed thereon in corresponding to the screw bores 36 on the upper deck 30 or screw bores 47 on the lower chassis 40 so that both of front and rear hatches 50 can hermetically seal both front sides 43 and 44 as well as both rear sides 34 and 44 of the interim integral assembly of the upper deck 30 and lower chassis 40 in plenum manner including all water passages 303 of continual zigzag circulating duct with septa 37 therein (as shown in FIGS. 7 and 8).

Referring to FIGS. 4 through 6, the assembling process is described as below. Firstly, align and insert the male dovetailed upper docking latch bar 38 on the upper deck 30 into the female dovetailed lower docking latch bar 46 on the lower chassis 40 (as shown in FIG. 4); secondly, simultaneously apply forces on both of the rear side 34 on the upper deck 30 and the front side 43 on the lower chassis 40 in opposed inward manner to dock both of the upper deck 30 and lower chassis 40 up to flush manner so that a interim integral assembly of the upper deck 30 and lower chassis 40 is assembled (as shown in FIG. 5); and finally, cover both of front and rear hatches 50 on both front sides 43 and 44 as well as both rear sides 34 and 44 of the interim integral assembly of the upper deck 30 and lower chassis 40, then drive (screws N) in the punched holes 51 on the upper deck 30 through the punched holes 51 on the lower chassis 40 to securely fix the interim integral assembly of the upper deck 30 and lower chassis 40 into a final plenum (as shown in FIG. 8).

Please refer to FIGS. 9 and 10. The installation and operation methods for a heat exchanger for bathing shower of the present invention are described as below. By means of proper pipe fittings, connect a water inlet pipe 23 of tap water to the water intake 301 on the upper deck 30 while connect a water outlet pipe 22 in water intake 11 of a water heater 10 to the water outtake 302 on the same upper deck 30 to finish the installation before operation (as shown in FIG. 9). For shower, firstly, upon a shower user M starting shower, certain hot shower water W, which comes from the water heater 10 and flow through a water outlet pipe 12, will spray out of the shower sprayer 13; secondly, the hot shower water W will drop on the flat top surface 31 of the upper deck 30 after shower on the body of the shower user M, meanwhile certain cold tap water W1 will flow into the water passages 303 of the upper deck 30 orderly via the water inlet pipe 23 and the water intake 301 of the upper deck 30, then circulate among all water passages 303 by means of every circulating bore 39 on each septum 37 (as indicated by arrowhead shown in FIG. 10) to absorb thermal energy of the dropped hot shower water W on the flat top surface 31 of the upper deck 30 so that the cold tap water W1 becomes warm heat-exchanged water W2; and finally, the warm heat-exchanged water W2 then flows out of the water outtake 302 on the upper deck 30; and then flows into the water heater 10 orderly via the water outlet pipe 22 and the water intake 11 thereof for serving as warm feeding water (as shown in FIG. 9). Thereby, the energy-saving effect for such as electricity or gas consumption of the water heater 10 is achieved.

The energy-saving effect for such as electricity or gas consumption of the conventional "heat exchanger for bathing shower" is basically achieved after practical test for product thereof. However, there is a blemish in an otherwise perfect thing that the measured "recovering rates for the residual heat in spent shower water" for the conventional "heat exchanger for bathing shower" is only in range of 15-20%. Accordingly, how to substantially increase the overall "efficiency of heat exchange" so that the energy-saving effect for such as electricity or gas consumption thereof can be essentially enhanced becomes a further seeking goal. Via constantly study and research, an expected sample of the present invention is eventually contrived with measured "recovering rates for the residual heat in spent shower water" for the present invention of "thermal energy exchanger for bathing shower water" is over 50%.

SUMMARY OF THE INVENTION

The primary object of the present invention is to provide a thermal energy exchanger for bathing shower water comprising a stacked upper deck and a founded lower chassis as well as a front hatch and a rear hatch, wherein the upper deck, which is a planiform cuboid extruded by metal material and encompassed by a creased top surface with certain screw bores suitably located thereon, a bottom surface, a front side, a rear side, a pair of parallel flanks, includes a plurality of parallel septa downwardly disposed on the inner bottom surface, a longitudinal T-shaped docking latch bar being downwardly formed on the terminal of each septum while a longitudinal L-shaped docking latch bar being downwardly formed on the terminal of each flank, a plurality of parallel heat conducting ribs being created between each pair of adjacent septa in inner bottom surface such that the length of the heat conducting rib is shorter than that of the septum; the lower chassis, which is a planiform slab extruded by non-metal material and encompassed by a top surface, a flat sole surface with certain screw bores suitably located thereon, a front side, a rear side, a pair of parallel flanks with same planar shape and area in mating with the upper deck, includes a plurality of longitudinal inverted T-shaped docking latch groove, which are upwardly formed on the top surface in suitable positions corresponding to the longitudinal T-shaped docking latch bars between each pair of adjacent septa on the upper deck, a longitudinal flute on each flank, which is to securely mate with corresponding to the longitudinal L-shaped docking latch bar for each flank on the upper deck, as well as a water intake and a water outtake perforated between the top surface and sole surface; and each hatch, which is a planiform slab with suitable planar shape and area to properly cover the front sides and the rear sides for an interim integral assembly of the upper deck and lower chassis in flush manner, has two rows of certain punched fixing bores disposed thereon in corresponding to the certain screw bores on the upper deck and certain screw bores on the lower chassis so that both of front and rear hatches can hermetically seal both front sides and as well as both rear sides and of the interim integral assembly of the upper deck and lower chassis in plenum manner via screws run through all certain punched fixing bores and corresponding certain screw bores and, and a trough, which combines passages between septa to create a water tunnel of continual zigzag circulating duct among septa therein. With creased top surface of the present invention, even the upper deck of the present invention has same top encompassed area as that for the flat top surface of the conventional upper deck, the actual contacting area with dropped shower water for the creased top surface of the present invention is considerably larger than that of the conventional flat top surface for the conventional "heat exchanger for bathing shower" in publishing number of CN102478367 of Chinese Invention Patent. With additional heat conducting ribs of the present invention, even the upper deck of the present invention has same length of water tunnel as that of the conventional upper deck, the actual heat conducting speed and quantity with dropped shower water for the upper deck with additional heat conducting ribs of the present invention is considerably quicker and larger than those of the conventional upper deck without heat conducting ribs for the conventional "heat exchanger for bathing shower" in publishing number of CN102478367 of Chinese Invention Patent.

BRIEF DESCRIPTION OF THE DRAWINGS

FIG. 9 is an installed schematic view showing practical usage for conventional "heat exchanger for bathing shower".

FIG. 21 is a cross sectional view for a modified upper deck in the first exemplary embodiment of the present invention.

FIG. 22 is a cross sectional view showing assembly of a modified upper deck with lower chassis in the first exemplary embodiment of the present invention.

FIG. 31 is a cross sectional view for an intermediately altered upper deck in the first exemplary embodiment of the present invention.

FIG. 32 is a cross sectional view for a laterally altered upper deck in the second exemplary embodiment of the present invention.

FIG. 33 is a cross sectional view showing assembly of one intermediately altered upper deck and two laterally altered upper decks with lower chassis in the first and second exemplary embodiments of the present invention.

FIG. 36 is a cross sectional view showing assembly of one intermediately adapted upper deck and two laterally adapted upper deck with lower chassis in the first and second exemplary embodiments of the present invention.

DETAILED DESCRIPTION OF THE PREFERRED EMBODIMENTS

Figure 1:
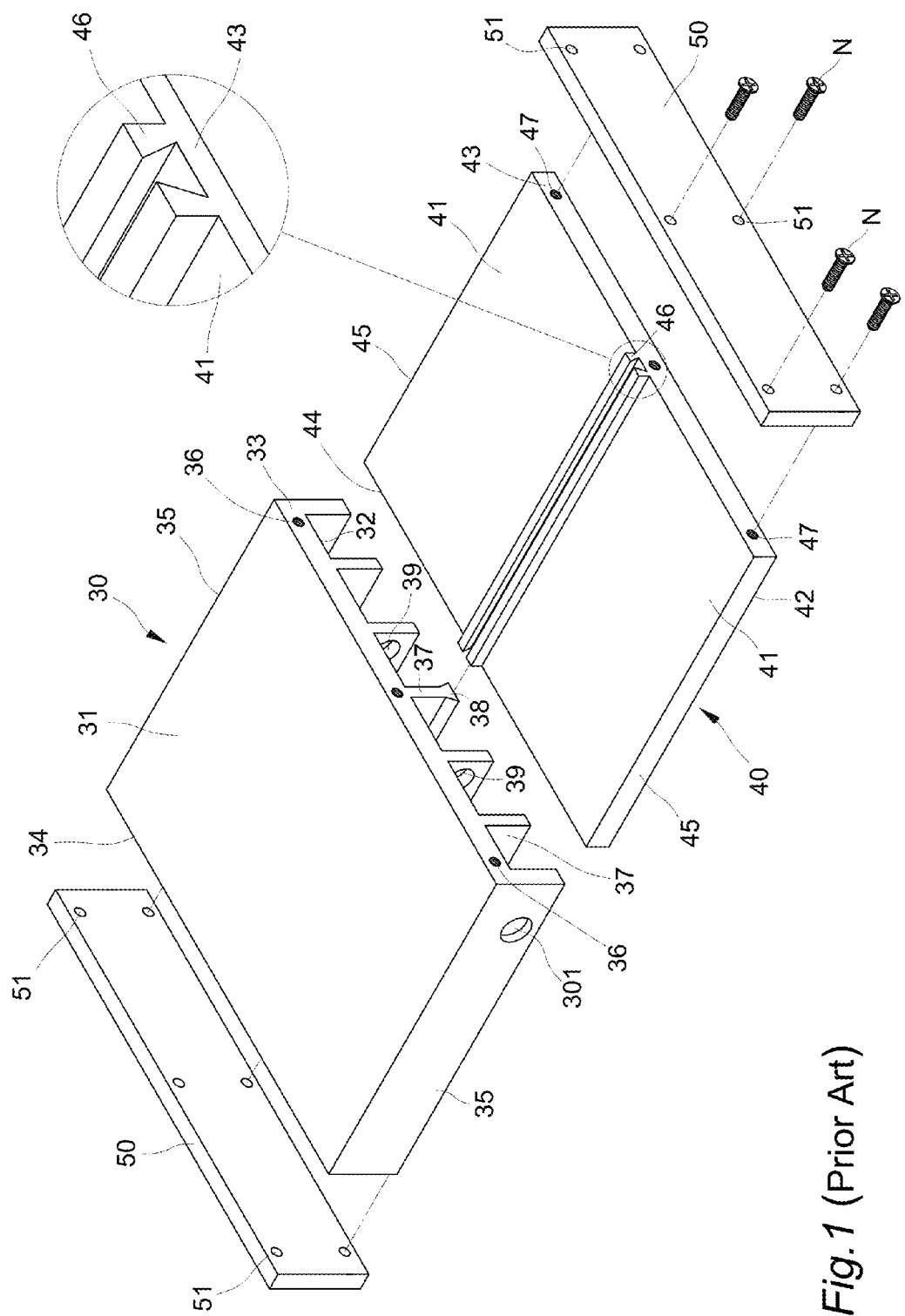
FIG. 1 is a perspective exploded view for conventional "heat exchanger for bathing shower".
Figure 2:
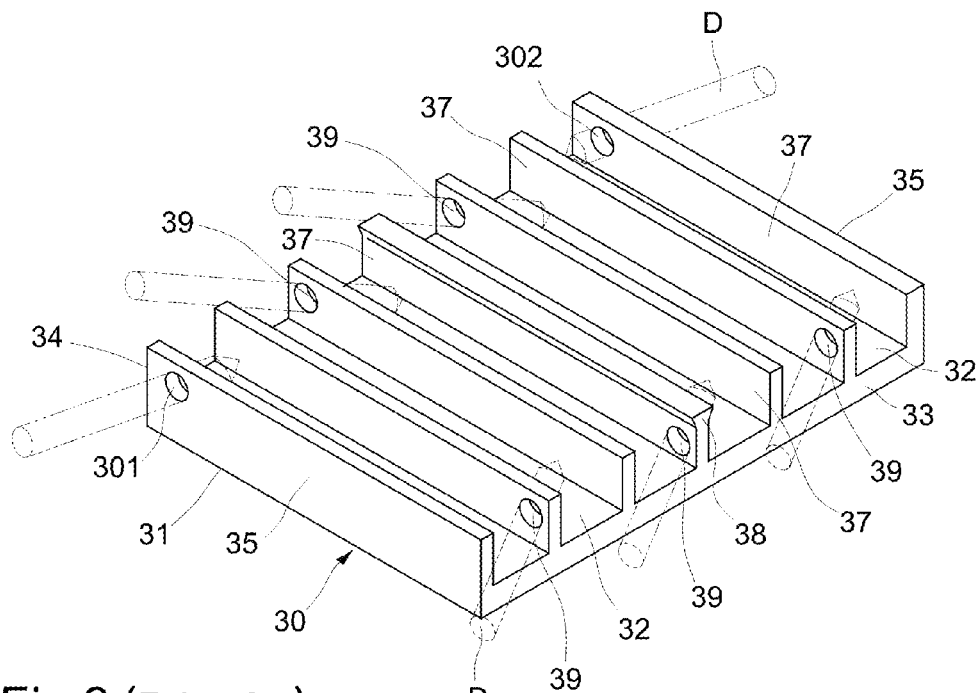
FIG. 2 is a perspective schematic view showing an upper deck under drilling bores process by a drilling tool for conventional "heat exchanger for bathing shower".
Figure 3:
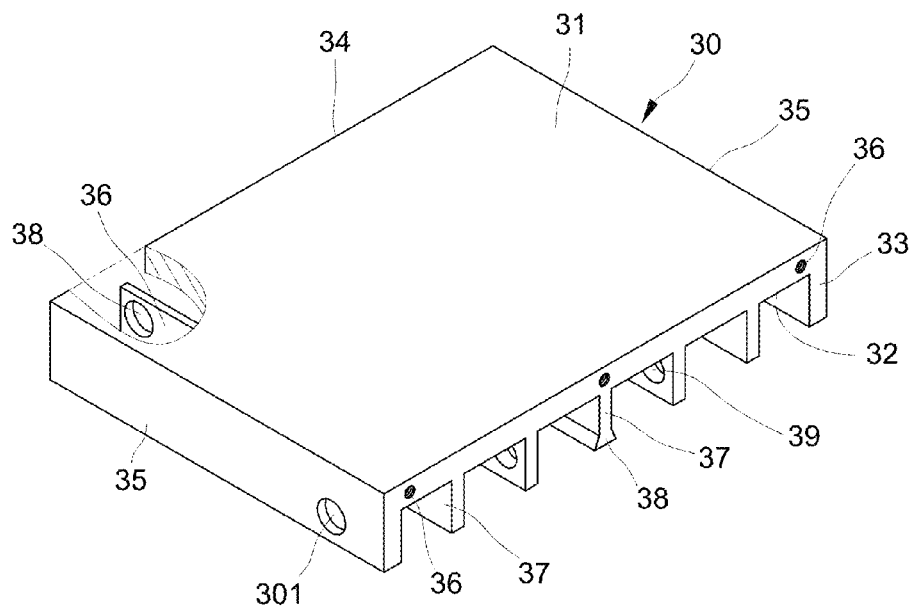
FIG. 3 is a perspective schematic view showing an upper deck for conventional "heat exchanger for bathing shower".
Figure 4:
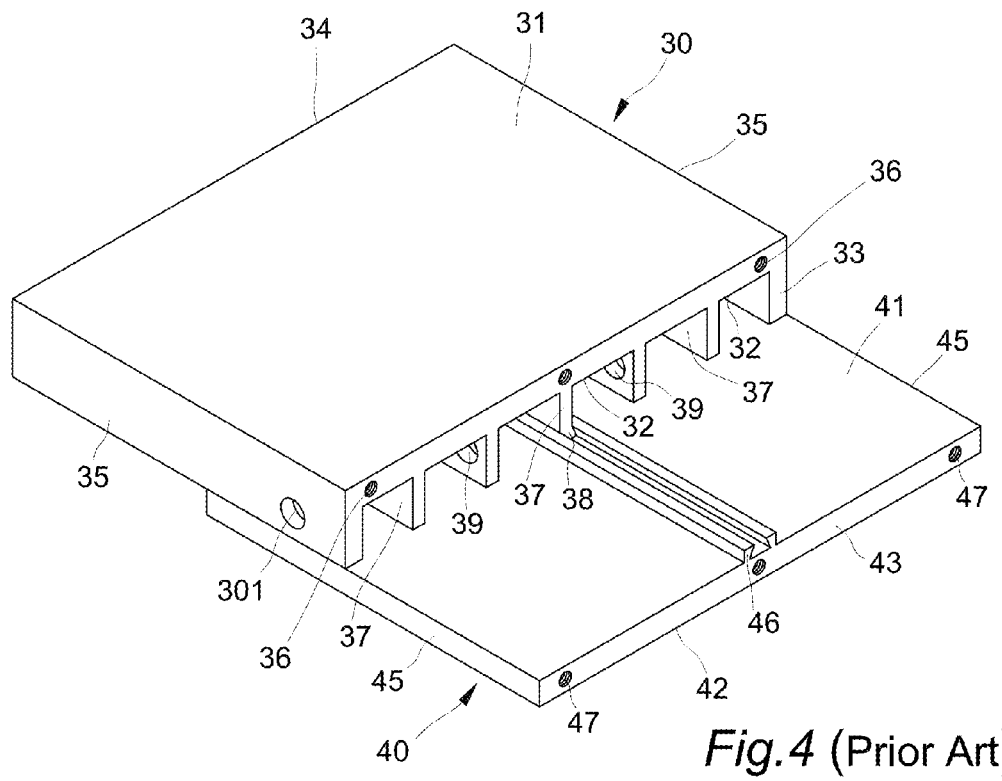
FIG. 4 is the first perspective schematic view showing assembling process for conventional "heat exchanger for bathing shower".
Figure 5:
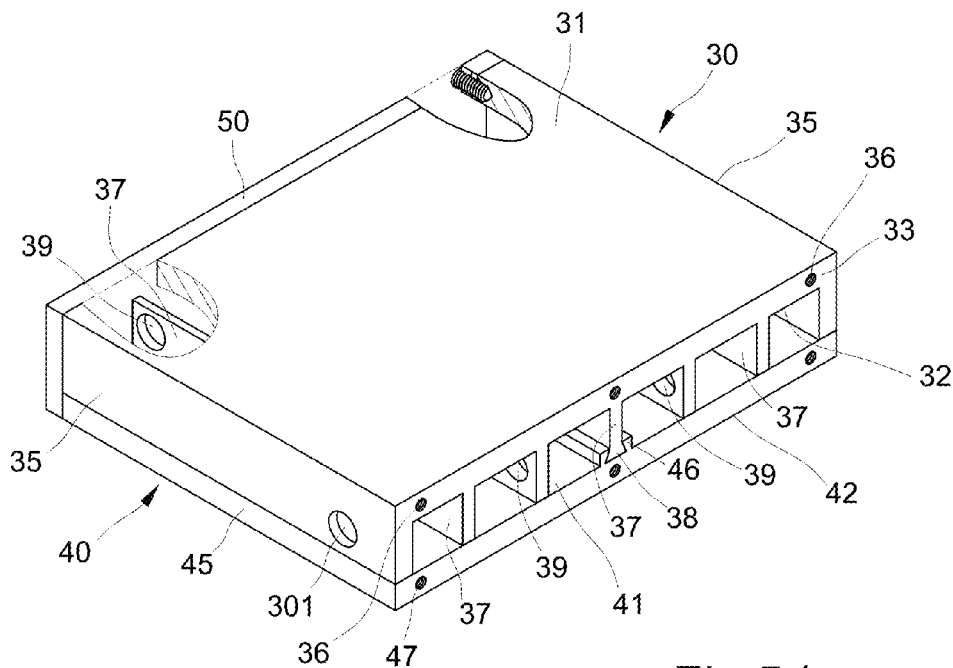
FIG. 5 is the second perspective schematic view showing assembling process for conventional "heat exchanger for bathing shower".
Figure 6:
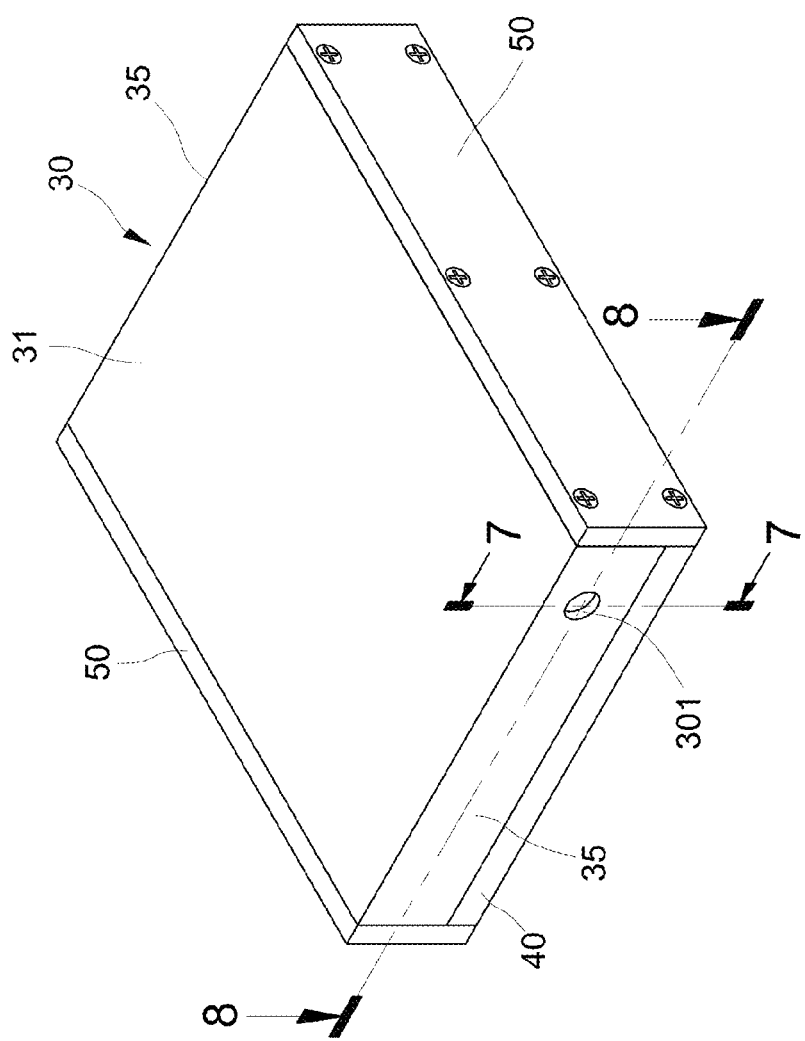
FIG. 6 is the third perspective schematic view showing assembling process for conventional "heat exchanger for bathing shower".
Figure 7:
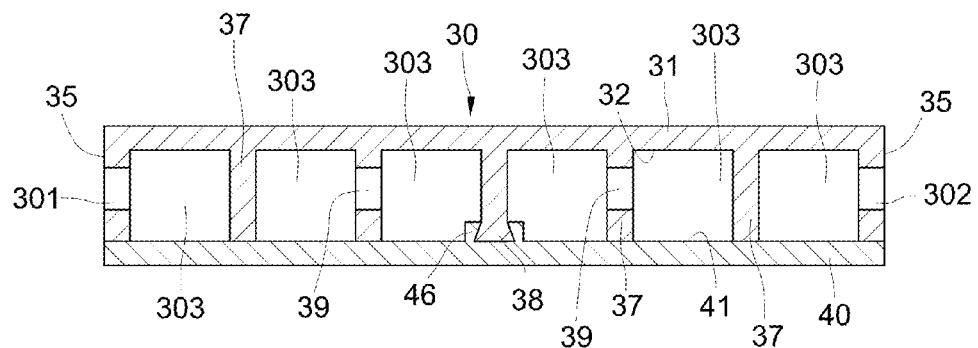
FIG. 7 is a cross sectional view taken against section line 7-7 from previous FIG. 6.
Figure 8:
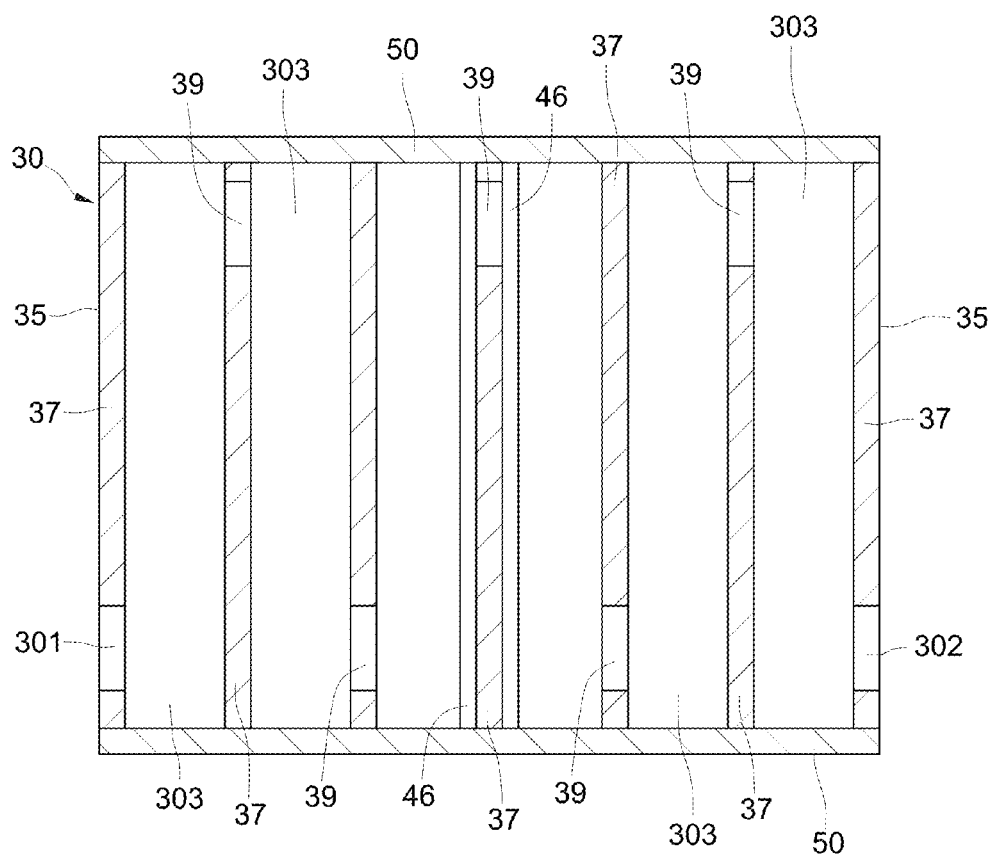
FIG. 8 is a cross sectional view taken against section line 8-8 from previous FIG. 6.
Figure 10:
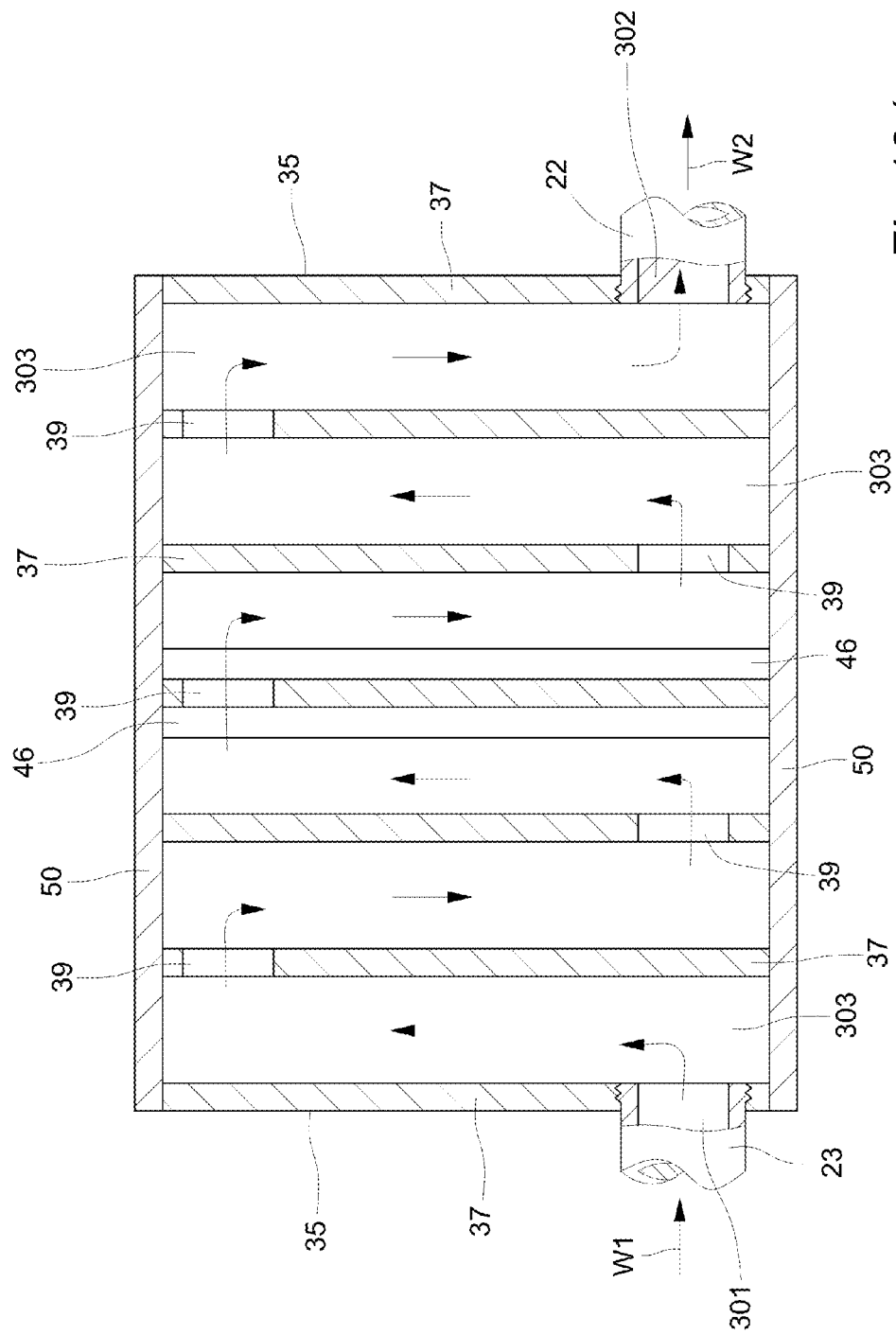
FIG. 10 is a cross sectional view taken against section line 10-10 from previous FIG. 9.
Figure 11:
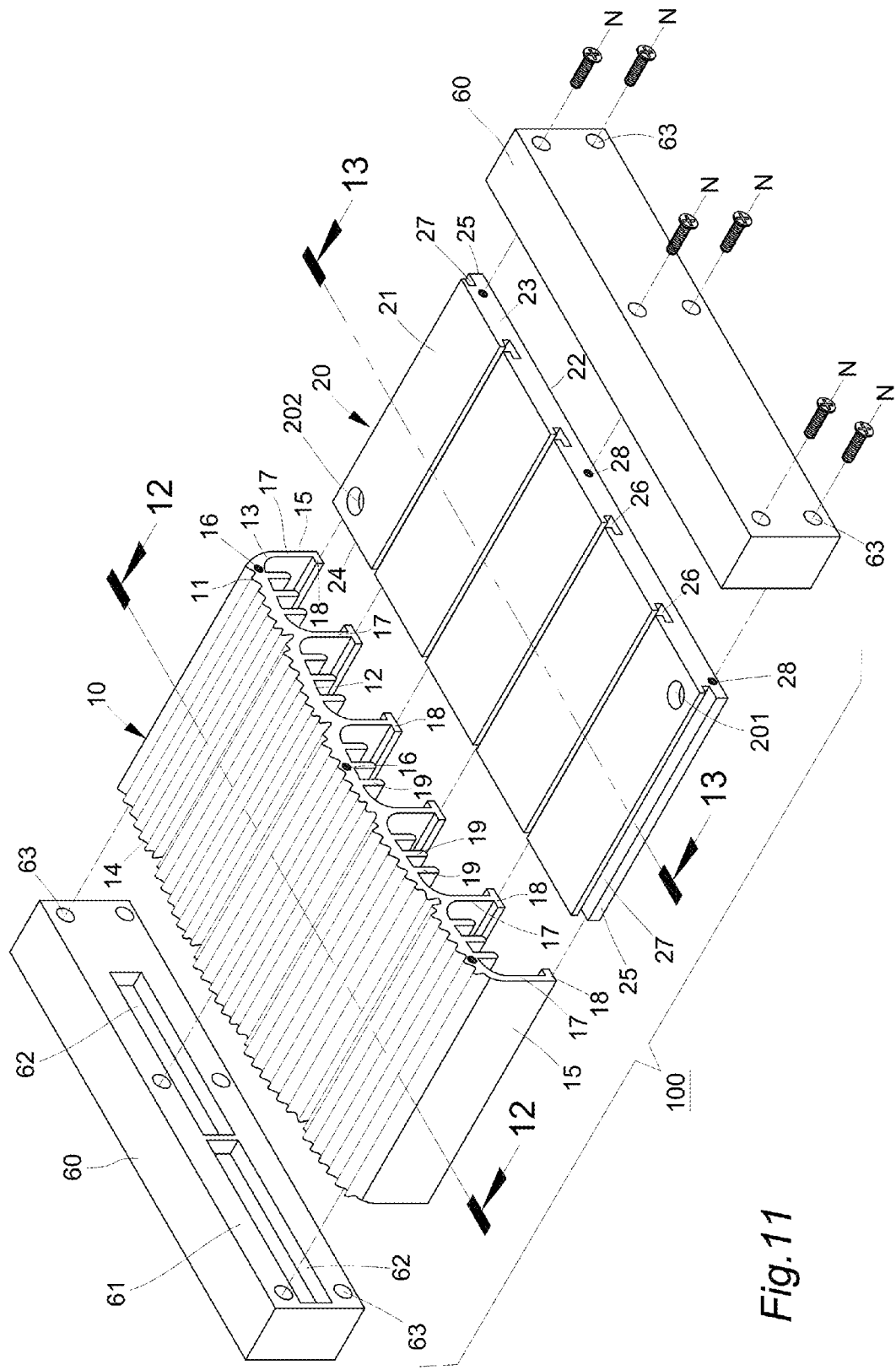
FIG. 11 is a perspective exploded schematic view for the first exemplary embodiment of the present invention.
Figure 12:
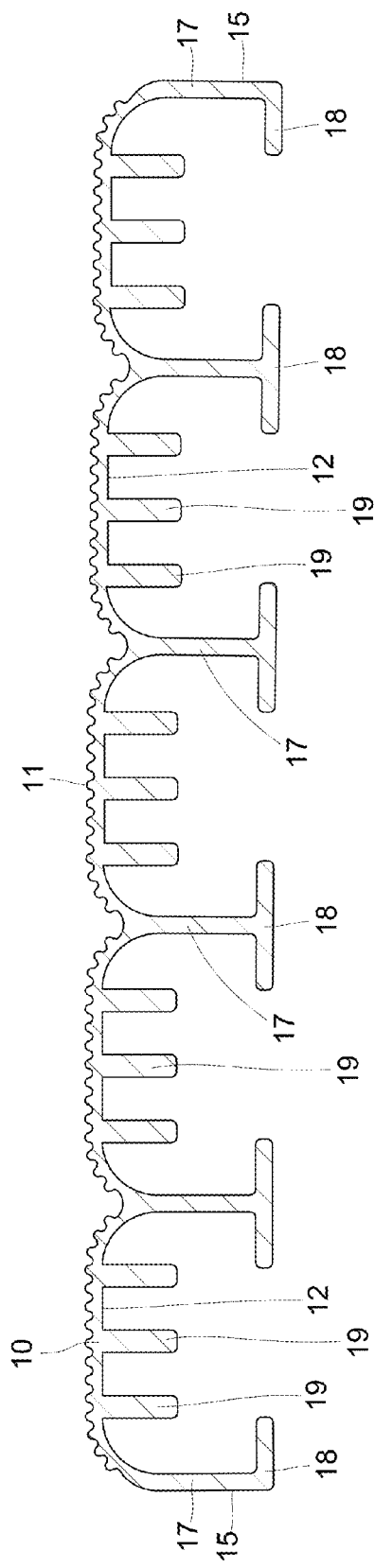
FIG. 12 is a cross sectional view taken against section line 12-12 from previous FIG. 11.
Figure 13:
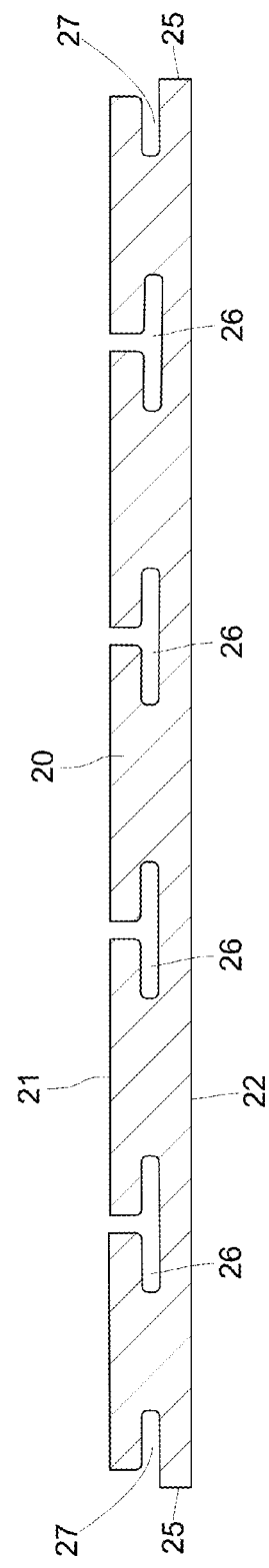
FIG. 13 is a cross sectional view taken against section line 13-13 from previous FIG. 11.
Figure 14:
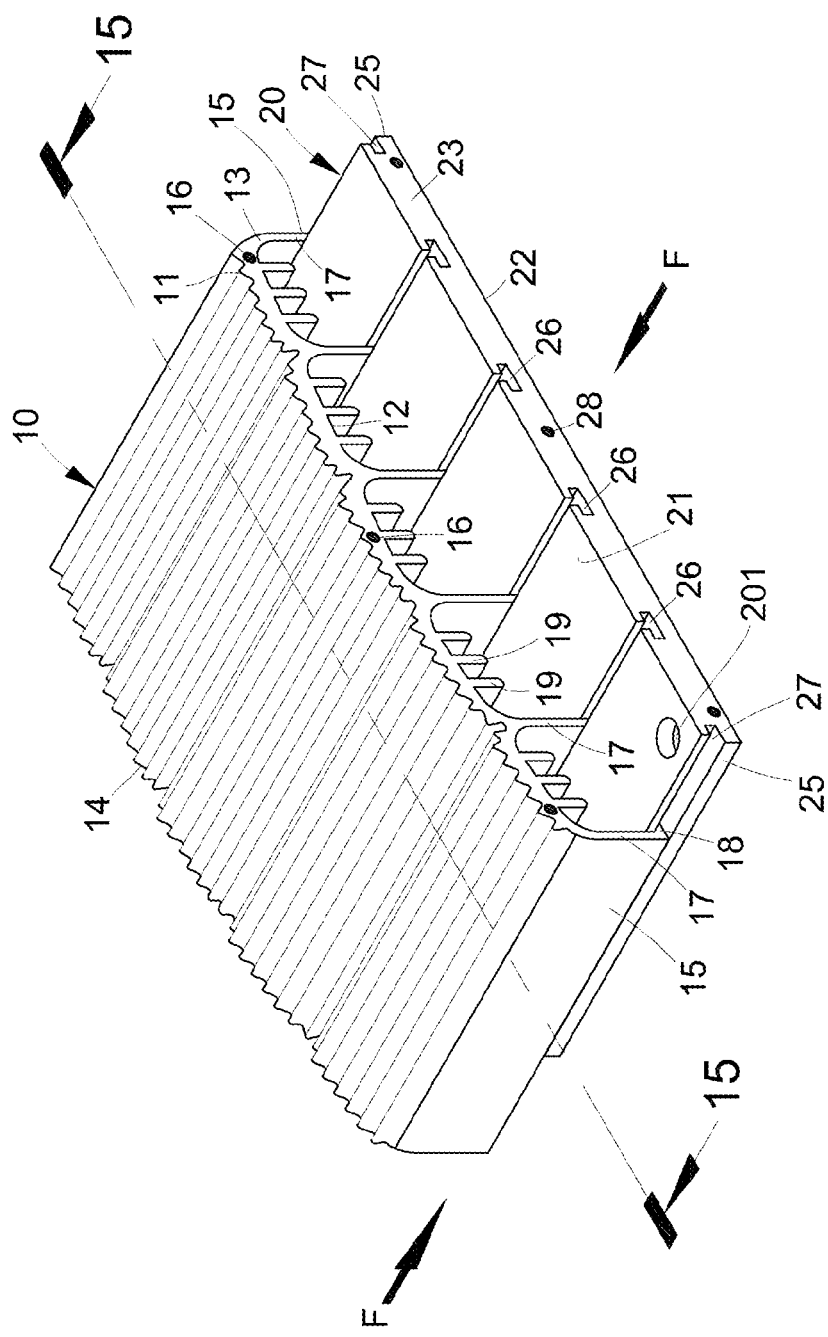
FIG. 14 is a perspective assembled schematic view for the first exemplary embodiment of the present invention.
Figure 15:
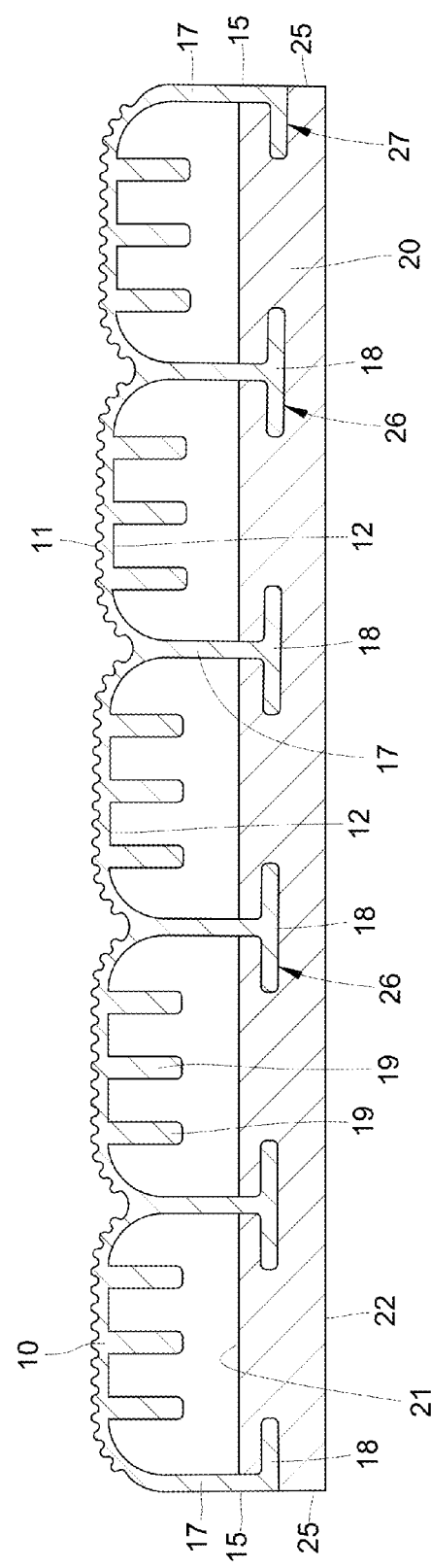
FIG. 15 is a cross sectional view taken against section line 15-15 from previous FIG. 14.
Figure 16:
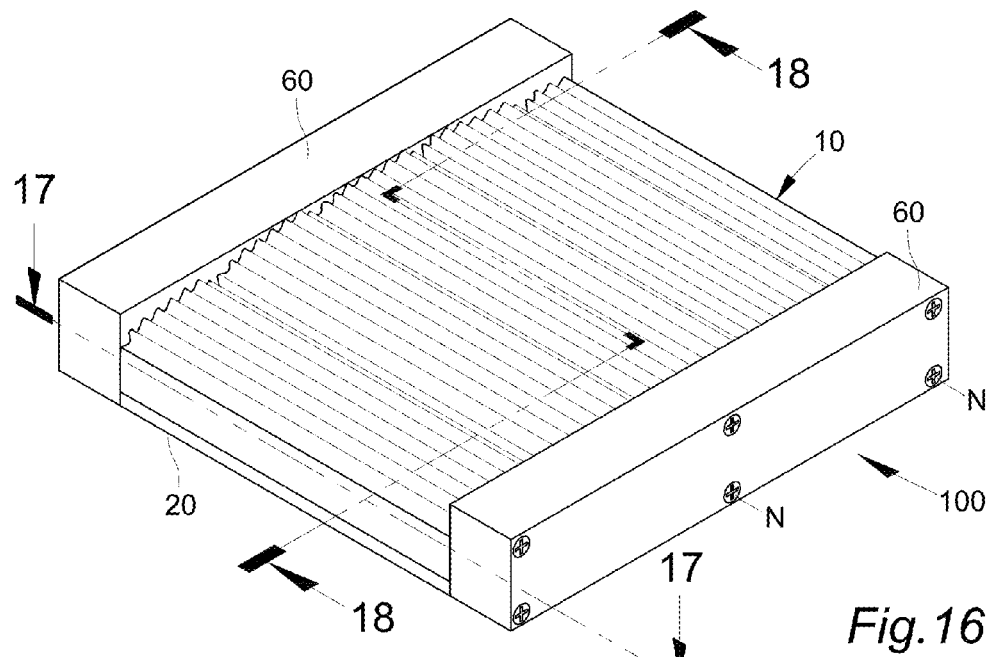
FIG. 16 is a perspective assembled view for the first exemplary embodiment of the present invention.
Figure 17:
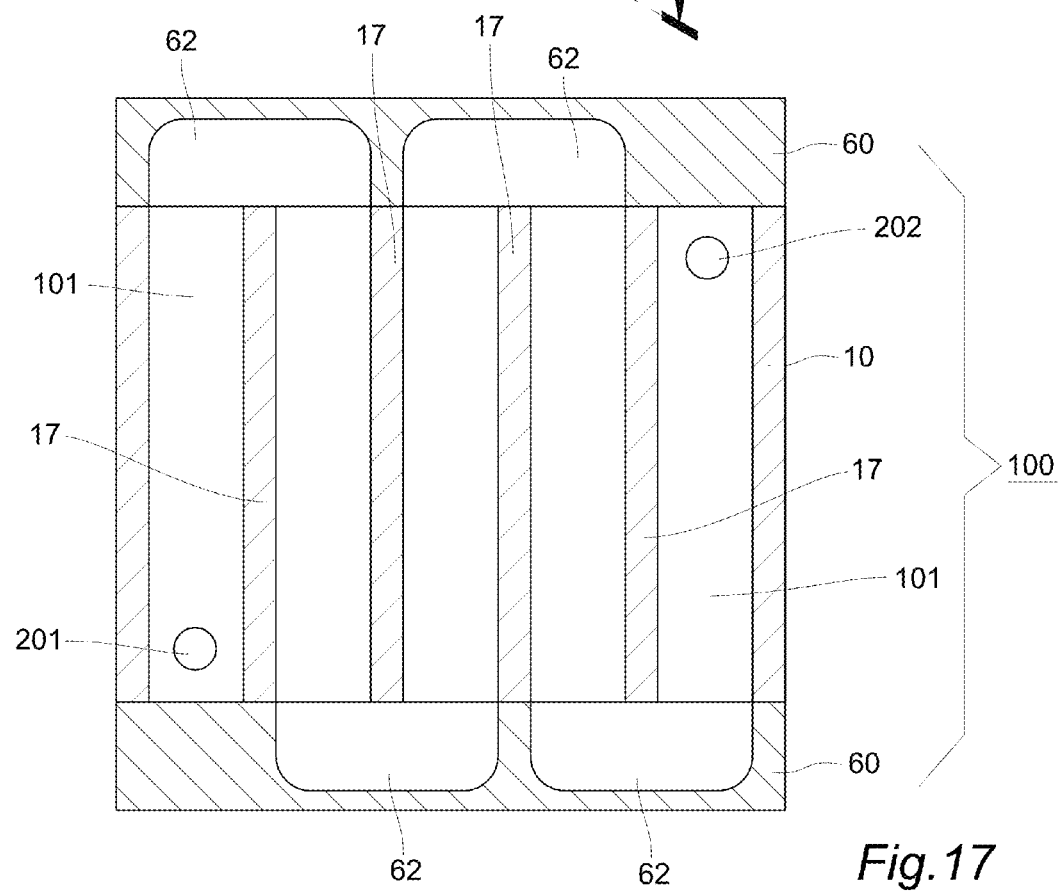
FIG. 17 is a cross sectional view taken against section line 17-17 from previous FIG. 16.

Referring to FIGS. 11 through 17, the structure for the first exemplary embodiment in the "thermal energy exchanger for bathing shower water" 100 of the present invention comprises a stacked upper deck 10 and a founded lower chassis 20 as well as a front hatch 60 and a rear hatch 60, wherein said upper deck 10, which is a planiform cuboid extruded by metal material and encompassed by a creased top surface 11 with certain screw bores 16 suitably located thereon, a bottom surface 12, a front side 13, a rear side 14, a pair of parallel flanks 15, includes a plurality of parallel septa 17 downwardly disposed on the inner bottom surface 12, a longitudinal T-shaped docking latch bar 18 being downwardly formed on the terminal of each septum 17 while a longitudinal L-shaped docking latch bar 18 being downwardly formed on the terminal of each flank 15, a plurality of parallel heat conducting ribs 19 being created between each pair of adjacent septa 17 in inner bottom surface 12 such that the length of the heat conducting rib 19 is shorter than that of the septum 17 (as shown in FIG. 12); said lower chassis 20, which is a planiform slab extruded by non-metal material and encompassed by a top surface 21, a flat sole surface 22 with certain screw bores 28 suitably located thereon, a front side 23, a rear side 24, a pair of parallel flanks 25 with same planar shape and area in mating with the upper deck 10, includes a plurality of longitudinal inverted T-shaped docking latch groove 26, which are upwardly formed on the top surface 21 in suitable positions corresponding to the longitudinal T-shaped docking latch bars 18 between each pair of adjacent septa 17 on the upper deck 10, a longitudinal flute 27 on each flank 25 (as shown in FIG. 13), which is to securely mate with corresponding to the longitudinal L-shaped docking latch bar 18 for each flank 15 on the upper deck 10 (as shown in FIG. 15), as well as a water intake 201 and a water outtake 202 perforated between the top surface 21 and sole surface 22 (as shown in FIG. 11); and each hatch 60, which is a planiform slab with suitable planar shape and area to properly cover the front sides 13, 23 and the rear sides 14, 24 for an interim integral assembly of the upper deck 10 and lower chassis 20 in flush manner, has two rows of certain punched fixing bores 63 disposed thereon in corresponding to the certain screw bores 16 on the upper deck 10 and certain screw bores 28 on the lower chassis 20 so that both of front and rear hatches 60 can hermetically seal both front sides 13 and 23 as well as both rear sides 14 and 24 of the interim integral assembly of the upper deck 10 and lower chassis 20 in plenum manner via screws N run through all certain punched fixing bores 63 and corresponding certain screw bores 16 and 28, and a trough 62, which combines passages between septa 17 to create a water tunnel 101 of continual zigzag circulating duct among septa 17 therein (as shown in FIG. 17) to assembly an integral thermal energy exchanger set 100.

Figure 18:
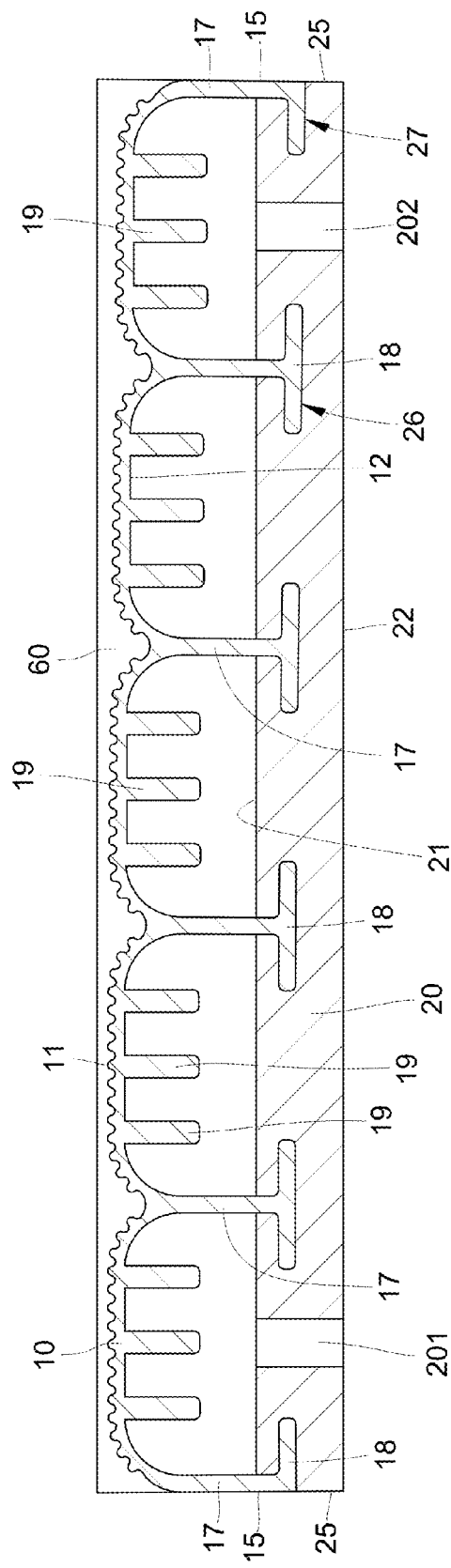
FIG. 18 is a cross sectional view taken against section line 18-18 from previous FIG. 16.

FIGS. 14 through 18 are views showing the assembling procedure for the first exemplary embodiment in the "thermal energy exchanger for bathing shower water" 100 of the present invention. Firstly, align and insert all the longitudinal docking latch bars 18 on the upper deck 10 into the longitudinal inverted T-shaped docking latch grooves 26 and longitudinal flutes 27 on the lower chassis 20 for snugly docking mutually (as shown in FIG. 14); secondly, simultaneously apply inwardly forces on both of the rear side 14 on the upper deck 10 and the front side 23 on the lower chassis 20 in opposed inward manner to dock both of the upper deck 10 and lower chassis 20 up to flush manner so that an interim integral assembly of the upper deck 10 and lower chassis 20 is assembled (as shown in FIGS. 14, 15 and 18); and finally, cover both of front and rear hatches 60 on both front sides 33 and 43 as well as both rear sides 34 and 44 of the interim integral assembly of the upper deck 30 and lower chassis 40, then drive screws N through two rows of certain punched fixing bores 63 thereon and corresponding certain screw bores 16 on the upper deck 10 and certain screw bores 28 on the lower chassis 20 to securely fix the hatches 60 as an integral assembly of the upper deck 30 and lower chassis 40 into a final plenum (as shown in FIG. 16).

Figure 19:
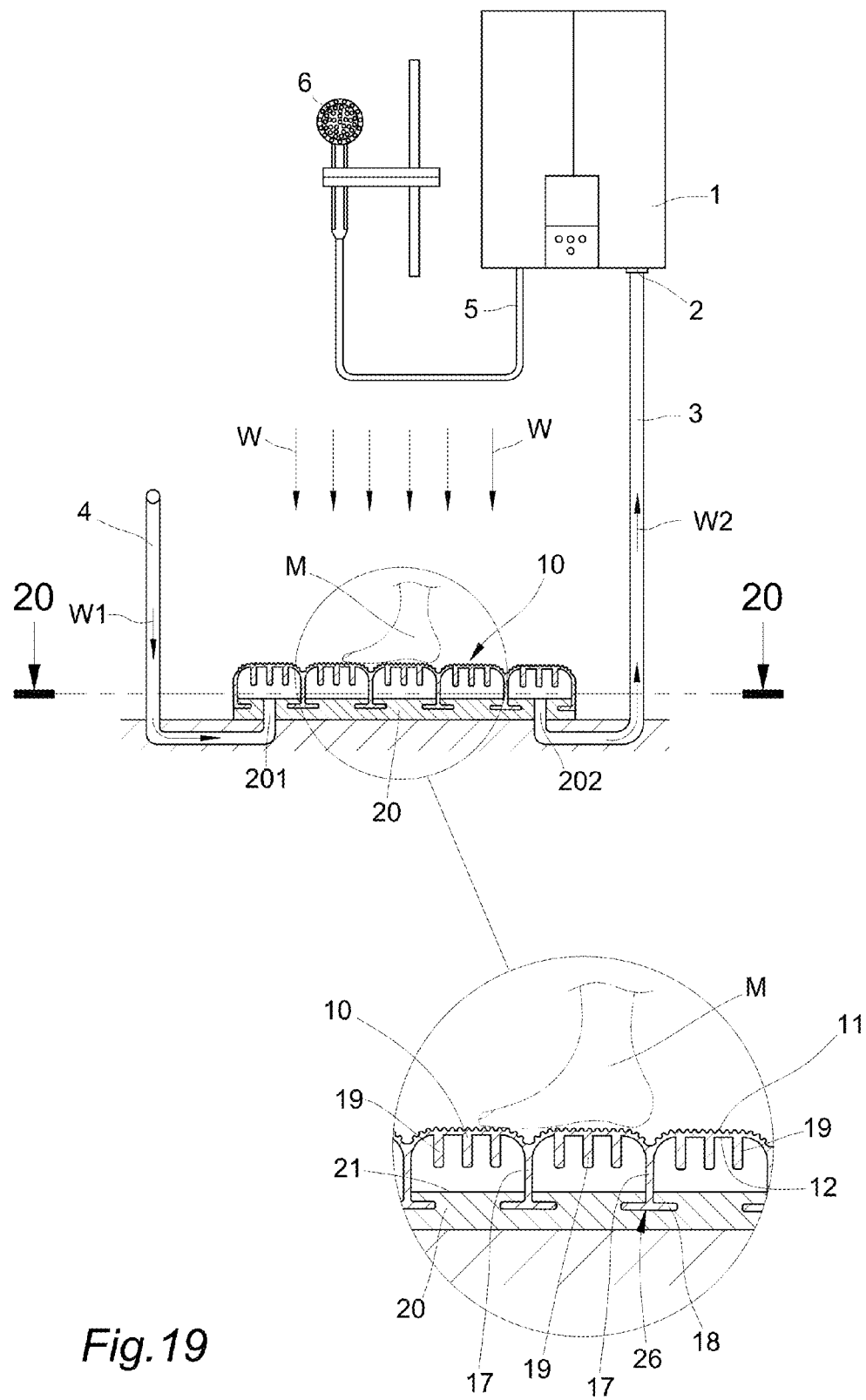
FIG. 19 is an operational schematic view after installation for the first exemplary embodiment of the present invention.
Figure 20:
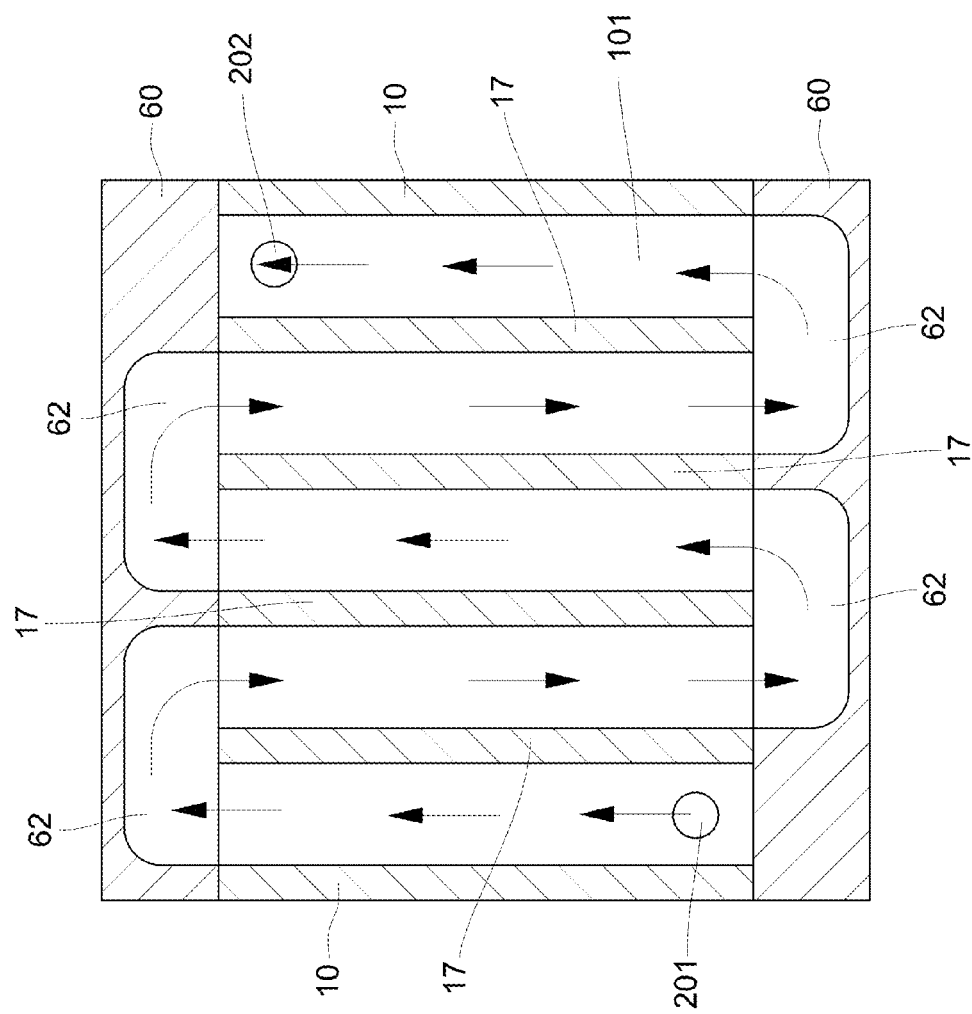
FIG. 20 is a cross sectional view taken against section line 20-20 from previous FIG. 19.
Figure 23:
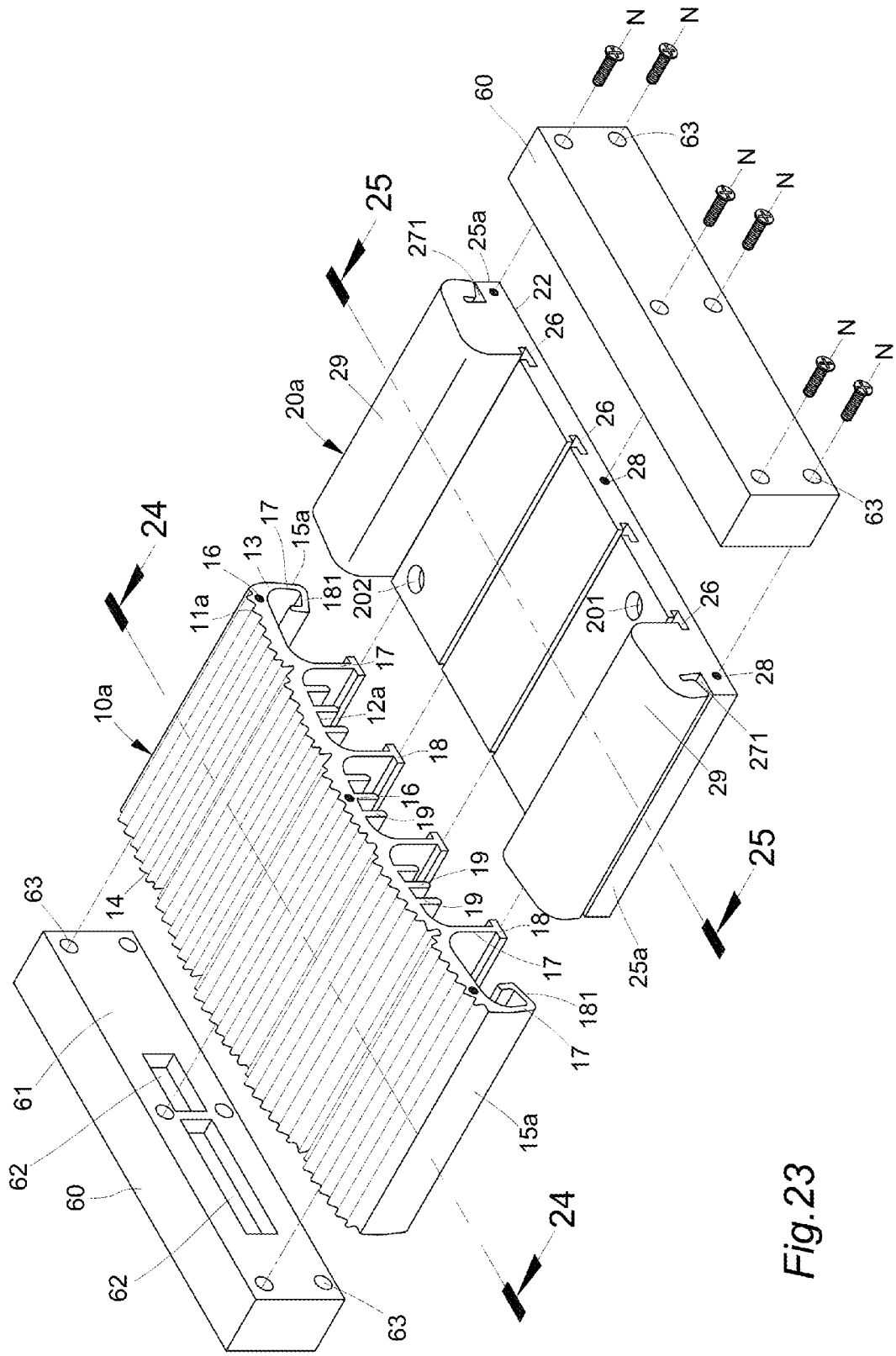
FIG. 23 is a perspective exploded view for the second exemplary embodiment of the present invention.

FIGS. 19 and 20 are views showing the installation and operating procedures for the first exemplary embodiment in the "thermal energy exchanger for bathing shower water" 100 of the present invention. For installation, by means of proper pipe fittings, connect a water inlet pipe 4 of tap water to the water intake 201 on the lower chassis 20 while connect a water outlet pipe 3 between water intake 2 of a water heater 1 and the water outtake 202 on the same lower chassis 20 to finish the installation before operation (as shown in FIG. 19). For operating shower, firstly, upon a shower user M starting shower, certain hot shower water W, which comes from the water heater 1 and flow through a water outlet pipe 5, will spray out of the shower sprayer 13;

secondly, the hot shower water W will drop on the flat top surface 11 of the upper deck 10 after shower on the body of the shower user M, meanwhile certain cold tap water W1 will flow into the water tunnel 101 orderly via the water inlet pipe 4 and the water intake 201 of the lower chassis 20, then circulate among the water tunnel 101 via two troughs 62 and combining passages between septa 17 (as indicated by arrowhead shown in FIG. 20) to absorb thermal energy of the dropped hot shower water W on the top surface 11 of the upper deck 10 so that the cold tap water W1 becomes warm heat-exchanged water W2; and finally, the warm heat-exchanged water W2 then flows out of the water outtake 202 on the lower chassis 20; and then flows into the water heater 1 orderly via the water outlet pipe 3 and the water intake 2 thereof for serving as warm feeding water (as shown in FIG. 19). Thereby, the energy saving effect for electricity of gas consumption of the water heater 1 is achieved.

Comparing to conventional "heat exchanger for bathing shower" in publishing number of CN102478367 of Chinese Invention Patent, the "thermal energy exchanger for bathing shower water" of the present invention apparently has two innovative contrivances of creased top surface 11 and additional heat conducting ribs 19. With creased top surface 11 of the present invention, even the upper deck 10 of the present invention has same top encompassed area as that for the flat top surface 31 of the conventional upper deck 30, the actual contacting area with dropped shower water for the creased top surface 11 of the present invention is considerably larger than that of the conventional flat top surface 11 for the conventional "heat exchanger for bathing shower" in publishing number of CN102478367 of Chinese Invention Patent. With additional heat conducting ribs 19 of the present invention, even the upper deck 10 of the present invention has same length of water tunnel 101 as that of the conventional upper deck 30, the actual heat conducting speed and quantity with dropped shower water for the upper deck 10 with additional heat conducting ribs 19 of the present invention is considerably quicker and larger than those of the conventional upper deck 10 without heat conducting ribs for the conventional "heat exchanger for bathing shower" in publishing number of CN102478367 of Chinese Invention Patent.

Figure 39:
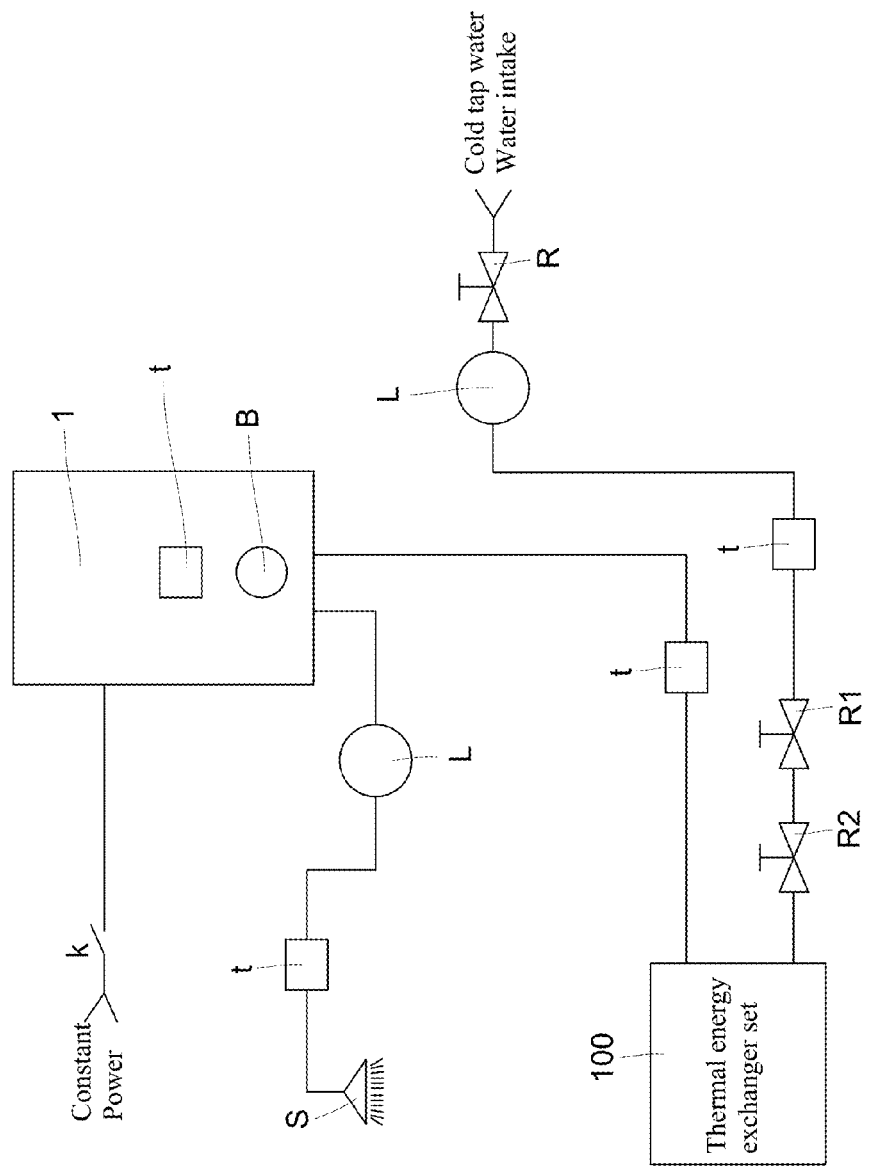
FIG. 39 is a piping and wiring schematic view for a recovery device in measuring the "recovering rates for the residual heat in spent shower water" of the present invention.

FIG. 39 is a piping and wiring schematic view for a recovery device in testing the "recovering rates for the residual heat in spent shower water" of the present invention.

1. Testing Conditions:

(a): Shower room is closed type with dimensions of length×width being in 90×90 cm.

(b): Ambient temperature is 25±2 degrees centigrade.

(c): Temperature for intake cold tap water is 15±1 degrees centigrade.

(d): Flux for intake cold tap water is 3±0.3 L/min.

(e): Shower sprayer S is centrally located above the top surface 11 for the upper deck 10 of the thermal energy exchanger set 100 with fixed height of 1.5 m.

(f): Diameter for water output of the shower sprayer S is not less than 1 mm.

(g): Temperature for output hot shower water W of the shower sprayer S is 45±1 degrees centigrade.

2. Testing Method:

Step 1: Open valve for inlet tap water R, valve for intake water R1 and flow regulating valve R2 so that the flux for intake cold tap water is 3±0.3 L/min and measure the temperature for intake cold tap water is 15±1 degrees centigrade.

Step 2: Turn on power switch K and adjust the power adjust knob B of the water heater 1 such that the temperature for output hot shower water W of the shower sprayer S is 45±1 degrees centigrade.

After 5 minutes stable period, measure actual temperature for output hot water of the shower sprayer S from water outtake 102 of the thermal energy exchanger set 100.

Step 3: Calculate the recovering rates for the residual heat in spent shower water" $\eta$ for testing parameters obtained from above procedure with formula as below:

$$\eta=[(\theta 2-\theta 1)/(\theta 3-\theta 1)]\times 100\%$$

Wherein:

$\eta$ denotes to "recovering rates for the residual heat in spent shower water".

$\theta 1$ denotes to "temperature for the intake water of the present invention".

$\theta 2$ denotes to "temperature for the outtake water of the present invention".

$\theta 3$ denotes to "temperature for the shower water output from the shower sprayer S".

Figure 40:
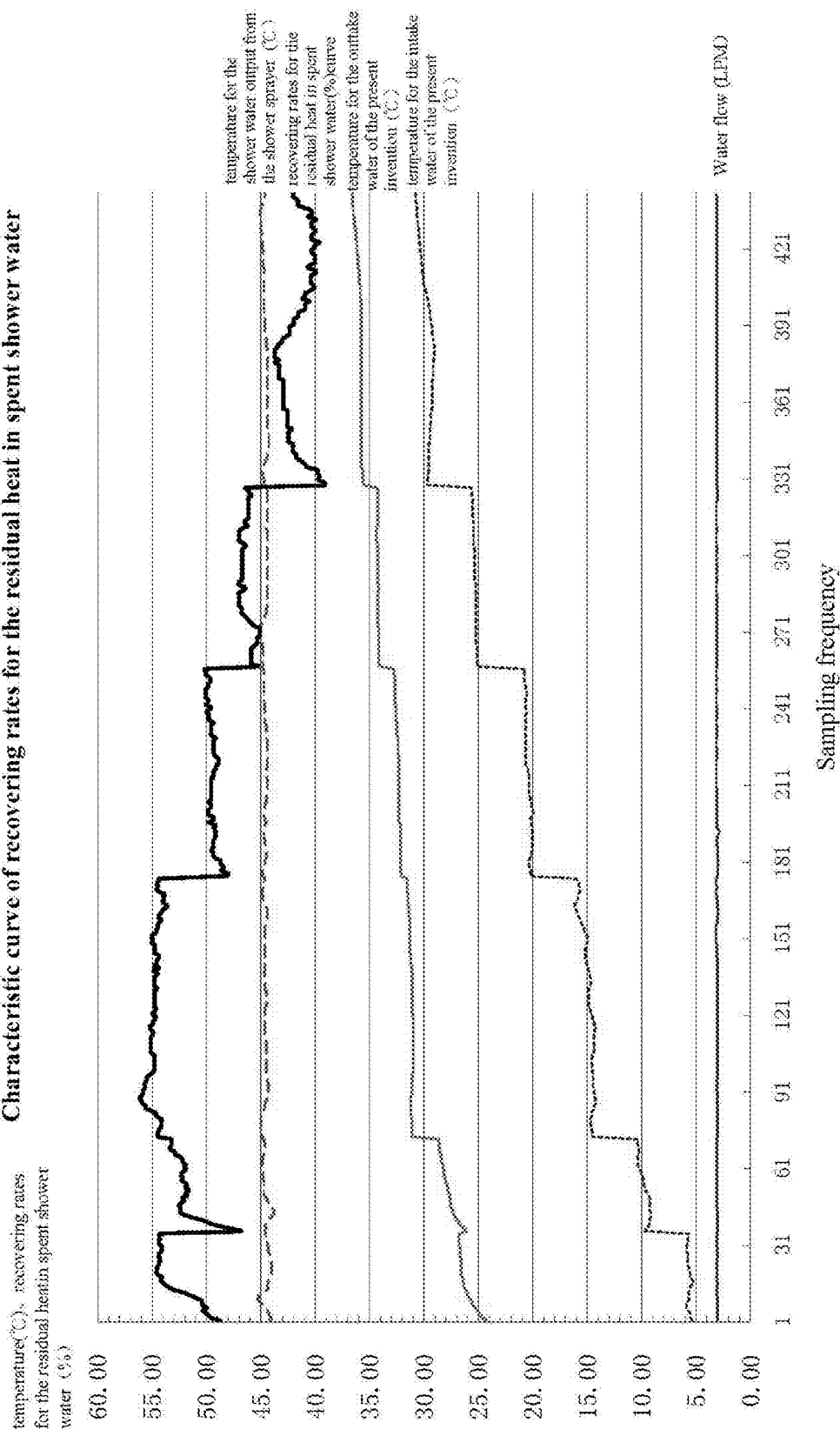
FIG. 40 is a characteristic diagram showing various "recovering rates for the residual heat" by multiple sampling of the present invention.

3. Testing Results:

According to the formula above, via 421 sampling tests with various parameters, a "characteristic curve of recovering rates for the residual heat in spent shower water" of the present invention is diagramed as shown in FIG. 40 with "number of sampling tests" as horizontal coordinate (X-axis) while "setting temperature and recovering rates for the residual heat in spent shower water" as vertical coordinate (Y-axis).

Specifically, taking the ninety-first sample in FIG. 40 as example, the "recovering rate for the residual heat in spent shower water" $\eta$ of the present invention is 56% based on the calculation from foregoing formula with parameters in association of using thermal energy exchanger set 100 as following:

$\theta 1$: Temperature for intake cold tap water is 14.5 degrees centigrade.

$\theta 2$: Temperature for outtake warm recover water is 31 degrees centigrade.

$\theta 3$: Temperature for output hot shower water W of the shower sprayer S is 44 degrees centigrade.

Generally, from manifestations for all data in every sample in FIG. 40 as supporting evidence, the "recovering rate for the residual heat in spent shower water" $\eta$ of the present invention achieves over 50% without doubt via using thermal energy exchanger set 100 of the present invention. Accordingly, the consumed energy quantity of the electricity or gas for using "thermal energy exchanger for bathing shower water" of the present invention can be doubly reduced comparing to that for using conventional "heat exchanger for bathing shower" in publishing number of CN102478367 of Chinese Invention Patent.

FIG. 21 is a cross sectional view for a modified upper deck in the first exemplary embodiment of the present invention while FIG. 22 is a cross sectional view showing assembly of a modified upper deck with lower chassis in the first exemplary embodiment of the present invention. Wherein, both sides of the heat conducting ribs 19 in the inner bottom surface 12 of the upper deck 10 are modified into corrugated surface 191 (as shown in FIG. 21) so that the heat exchanging efficiency for the upper deck 10 with heat conducting ribs 19 is further enhanced. Thus, not only the "recovering rates for the residual heat in spent shower water" $\eta$ in the water tunnel 101 is increased but also the consumed energy quantity of the electricity or gas is reduced (as shown in FIG. 22).

Figure 24:
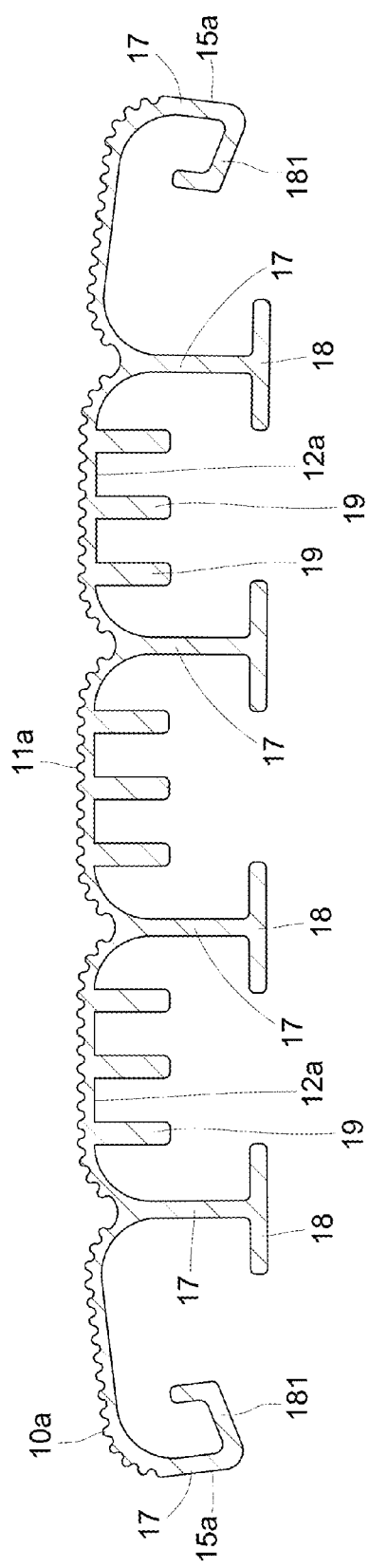
FIG. 24 is a cross sectional view taken against section line 24-24 from previous FIG. 23.
Figure 25:
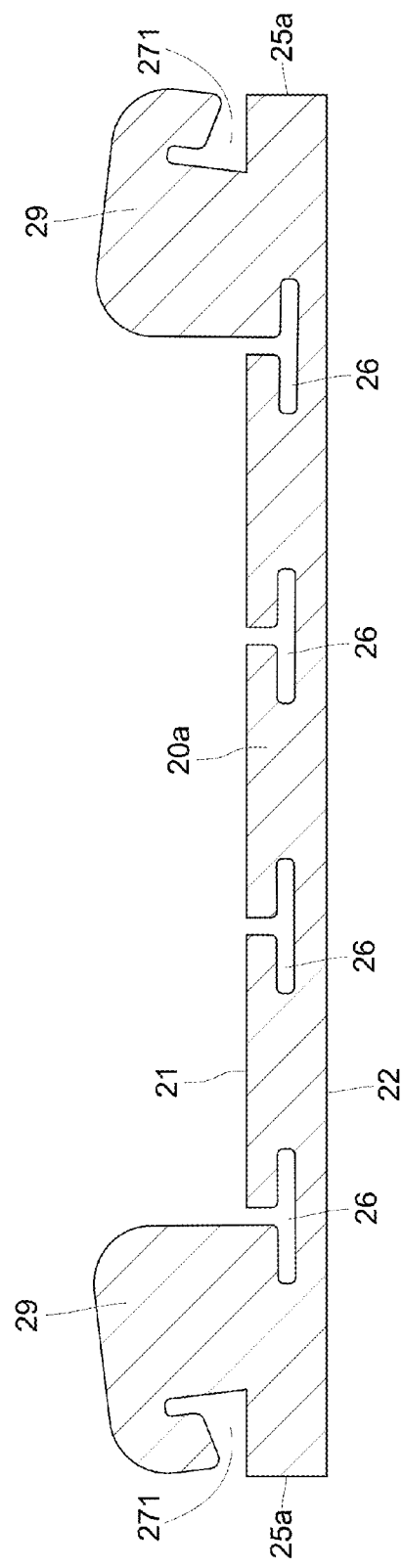
FIG. 25 is a cross sectional view taken against section line 25-25 from previous FIG. 23.
Figure 26:
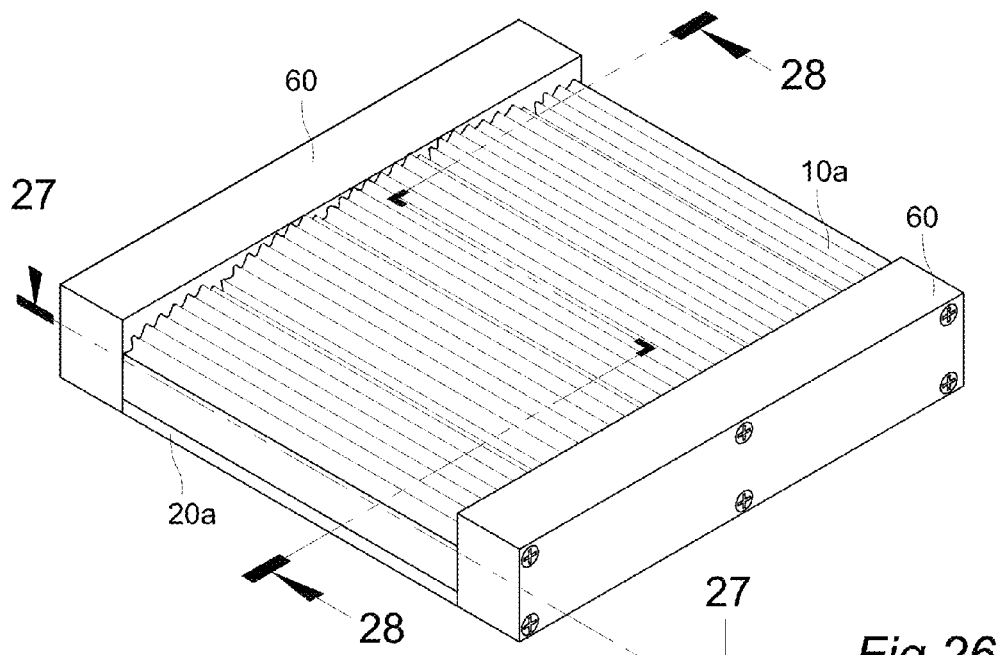
FIG. 26 is a perspective assembled view for the second exemplary embodiment of the present invention.
Figure 27:
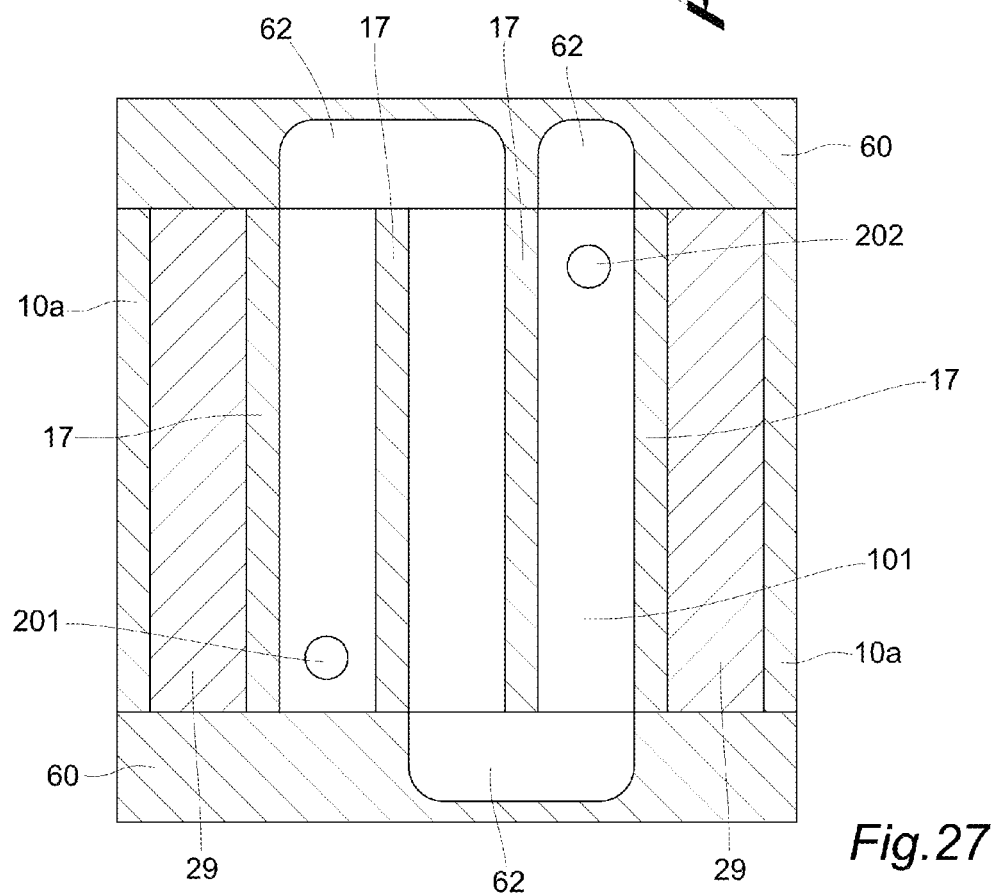
FIG. 27 is a cross sectional view taken against section line 27-27 from previous FIG. 26.
Figure 28:
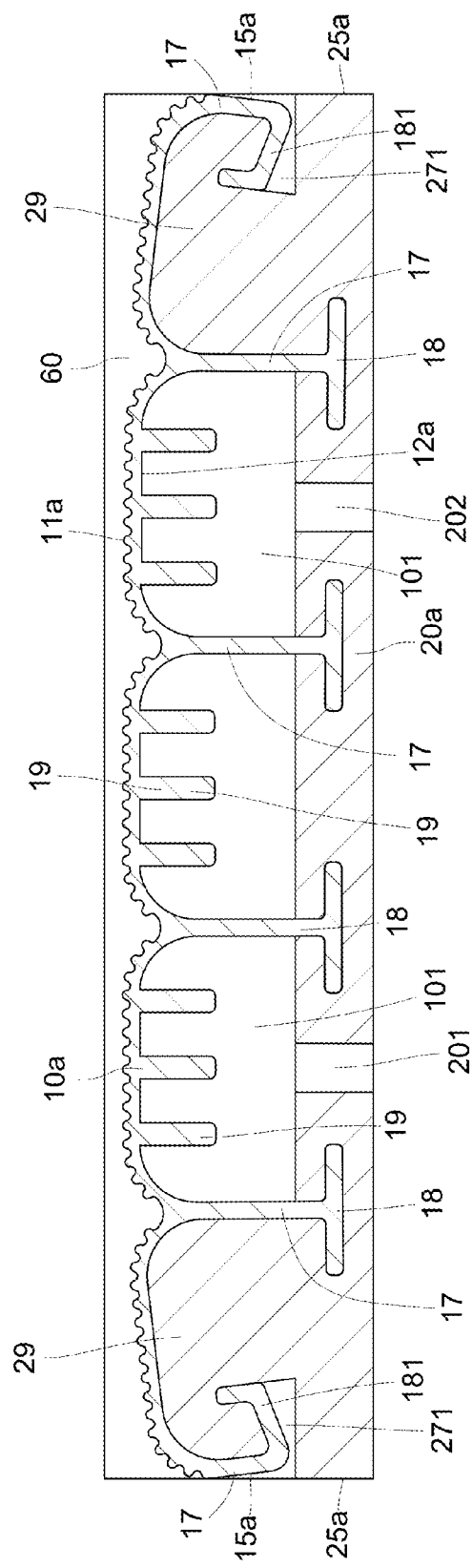
FIG. 28 is a cross sectional view taken against section line 28-28 from previous FIG. 26.

FIGS. 23 through 28 are views showing the structure for the second exemplary embodiment in the "thermal energy exchanger for bathing shower water" 100 of the present invention, wherein each end of the flank 15a in the upper deck 10a is changed into an upwardly tucked skirt 181 (as shown in FIG. 24) while each of flank 25a in the lower chassis 20a is changed into raised bar 29 with an inwardly tucked flute 271 (as shown in FIG. 25). Via snugly mating between each tucked flute 271 in the flank 25a of the lower chassis 20a and each corresponding tucked skirt 181 in the flank 15a of the upper deck 10a, the latching strength between the lower chassis 20a and upper deck 10a is substantially enhanced (as shown in FIGS. 27 and 28).

Figure 29:
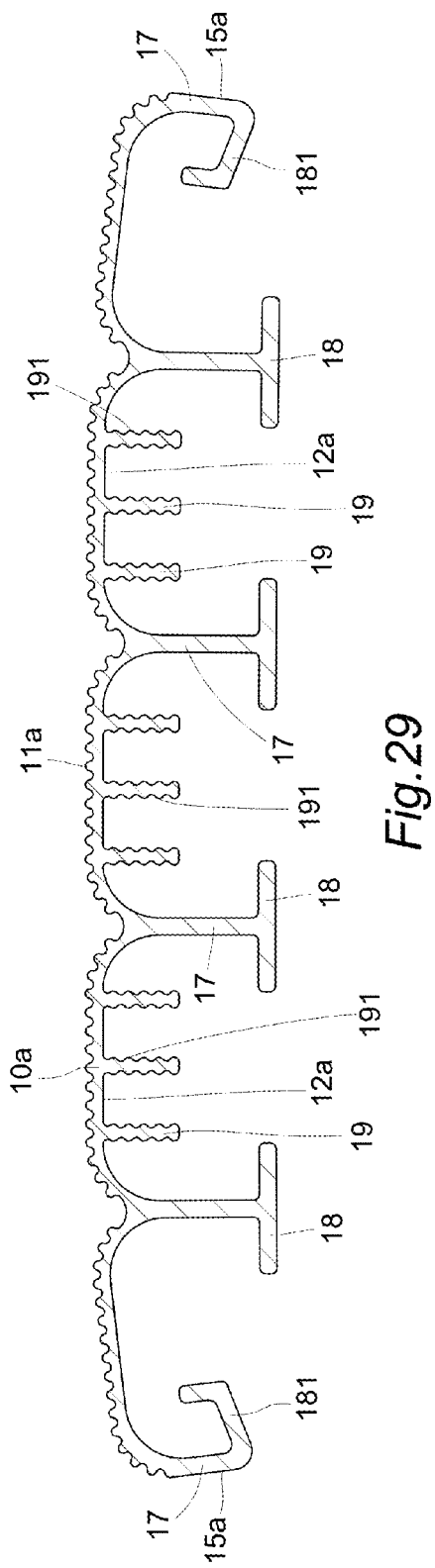
FIG. 29 is a cross sectional view for a corrugated surface of a modified upper deck in the second exemplary embodiment of the present invention.
Figure 30:
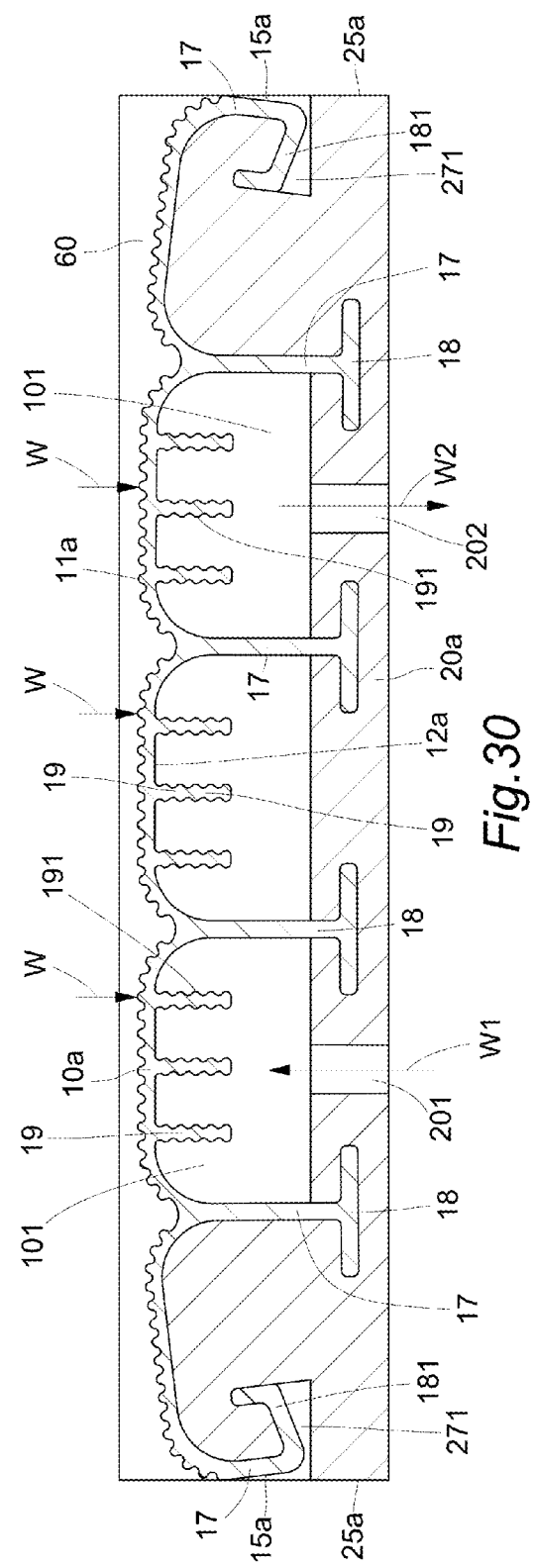
FIG. 30 is a cross sectional view showing assembly for a corrugated surface of a modified upper deck with lower chassis in the second exemplary embodiment of the present invention.

FIG. 29 is a cross sectional view for a corrugated surface 191 of a modified upper deck 10a in the second exemplary embodiment of the present invention while FIG. 30 is a cross sectional view showing assembly for a corrugated surface 191 of a modified upper deck 10a with lower chassis in the second exemplary embodiment of the present invention. Wherein, both sides of the heat conducting ribs 19 in the inner bottom surface 12a of the upper deck 10a are modified into corrugated surface 191 (as shown in FIG. 29) so that the heat exchanging efficiency for the upper deck 10a with heat conducting ribs 19 is further enhanced. Thus, not only the "recovering rates for the residual heat in spent shower water" η in the water tunnel 101 is increased but also the consumed energy quantity of the electricity or gas is reduced (as shown in FIG. 30).

Please refer to FIGS. 31 through 33. FIG. 31 is a cross sectional view for an intermediately altered upper deck in the first exemplary embodiment of the present invention, wherein a longitudinal extruding wing 111 with two slant inwardly latching ribs 112 in inner bottom surface 12 is disposed at each joint for each flank 15a and top surface 11b in an intermediately altered upper deck 10b (as shown in FIG. 31). FIG. 32 is a cross sectional view for a left laterally altered upper deck in the second exemplary embodiment of the present invention, wherein a longitudinal extruding groove 113 is disposed at right joint for the internal flank 15c and top surface 11c while a tucked skirt 181 is disposed at the left flank 15a in the left laterally altered upper deck 10c (as shown in FIG. 32); similarly, for a right laterally altered upper deck, wherein a longitudinal extruding groove 113 is disposed at left joint for the internal flank 15c and top surface 11c while a tucked skirt 181 is disposed at the right flank 15a in the right laterally altered upper deck 10c (not shown). FIG. 33 is a cross sectional view showing assembly of one intermediately altered upper deck and two laterally altered upper decks with lower chassis in the first and second exemplary embodiments of the present invention. Via snugly mating between each longitudinal extruding wings 111 with two slant inwardly latching ribs 112 at each flank 15b of the intermediately altered upper deck 10b in the first exemplary embodiment and each tucked flute 113 at internal flank 15c of the laterally altered upper deck 10c in the second exemplary embodiment (as indicated by two enlarged views shown in FIG. 33), the latching strength between the lower chassis 20a and upper deck 10a is substantially enhanced (as shown in FIG. 33) so that various floor covering areas in different shower room can be suitably fitted willfully at discretion of the user.

Figure 34:
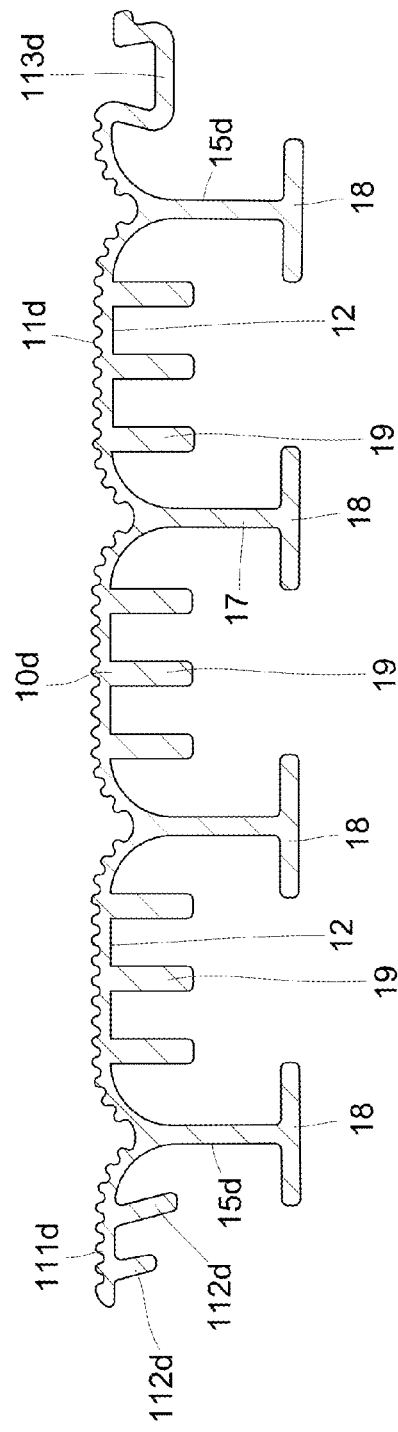
FIG. 34 is a cross sectional view for an intermediately adapted upper deck in the first exemplary embodiment of the present invention.
Figure 35:
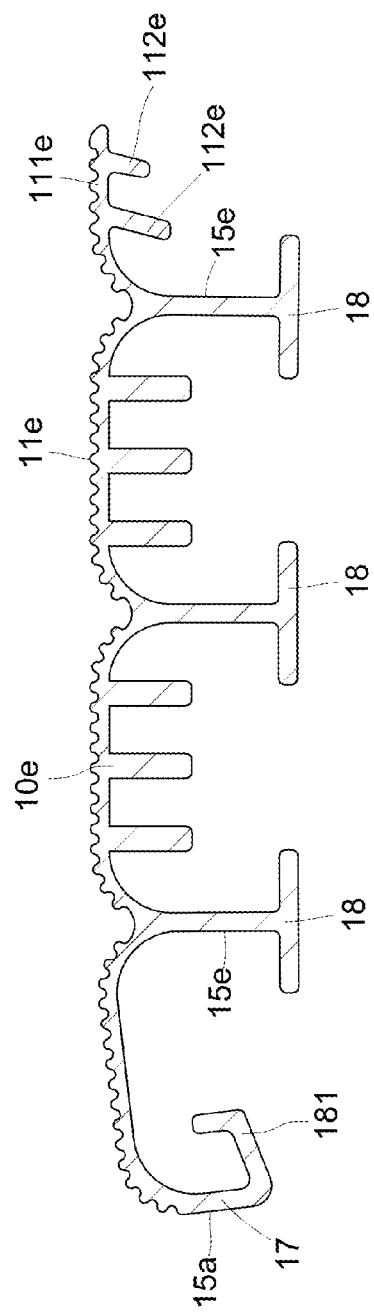
FIG. 35 is a cross sectional view for two laterally adapted upper decks in the second exemplary embodiment of the present invention.

Please refer to FIGS. 34 through 36. FIG. 34 is a cross sectional view for an intermediately adapted upper deck in the first exemplary embodiment of the present invention, wherein a longitudinal extruding wing 111d with two slant inwardly latching ribs 112d in inner bottom surface 12 is disposed at left joint for the flank 15d and top surface 11d while a longitudinal extruding groove 113d is disposed at right joint for the flank 15d and top surface 11d in an intermediately adapted upper deck 10d (as shown in FIG. 34). FIG. 35 is a cross sectional view for two laterally adapted upper decks in the second exemplary embodiment of the present invention, wherein a longitudinal extruding groove 113c is disposed at right joint for the internal flank 15c and top surface 11c while a tucked skirt 181 is disposed at the left flank 15a in left laterally adapted upper deck 10c (as shown in FIG. 35); conversely, a longitudinal extruding wing 111e with two slant inwardly latching ribs 112e is disposed at left joint for the internal flank 15e and top surface 11e while a tucked skirt 181 is disposed at the right flank 15a in right laterally adapted upper deck 10e (not shown). FIG. 36 is a cross sectional view showing assembly of one intermediately adapted upper deck and two laterally adapted upper deck with lower chassis in the first and second exemplary embodiments of the present invention. Via snugly mating between left longitudinal extruding wings 111d with two slant inwardly latching ribs 112d at left flank 15d of the intermediately adapted upper deck 10d in the first exemplary embodiment and right tucked flute 113c at right flank 15c of the laterally adapted upper deck 10c in the second exemplary embodiment (as indicated by left enlarged view shown in FIG. 36) as well as via snugly mating between right longitudinal extruding grooves 113d at right flank 15d of the intermediately adapted upper deck 10d in the first exemplary embodiment and left longitudinal extruding wings 111e with two slant inwardly latching ribs 112e at left flank 15e of the laterally adapted upper deck 10e in the second exemplary embodiment (as indicated by right enlarged view shown in FIG. 36), the latching strength between the lower chassis 20a and upper decks 10c, d, e is substantially enhanced (as shown in FIG. 36) so that various floor covering areas in different shower room can be suitably fitted willfully at discretion of the user.

Figure 37:
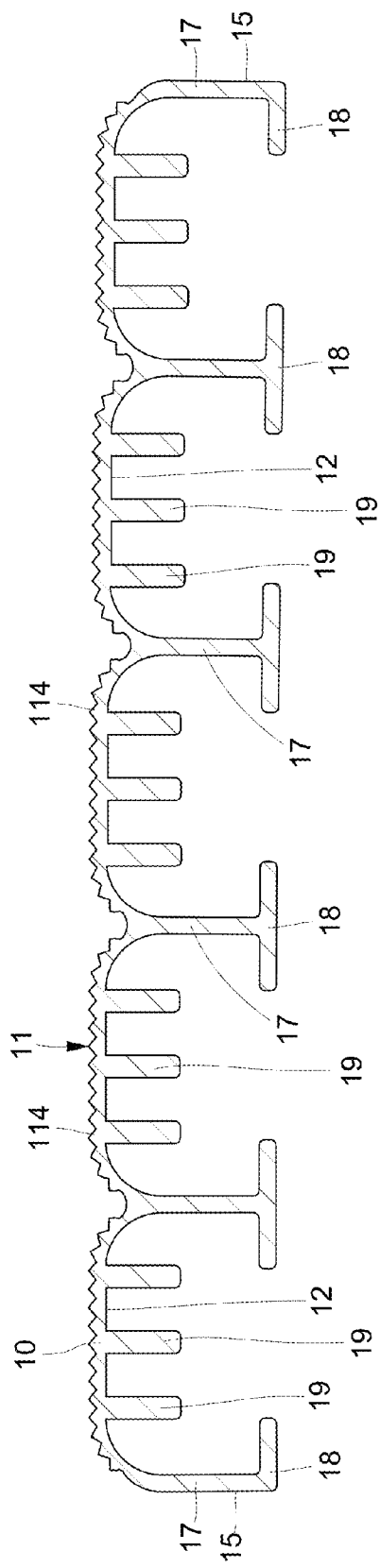
FIG. 37 is a cross sectional view for a serrated surface of the varied upper deck in the first exemplary embodiment of the present invention.
Figure 38:
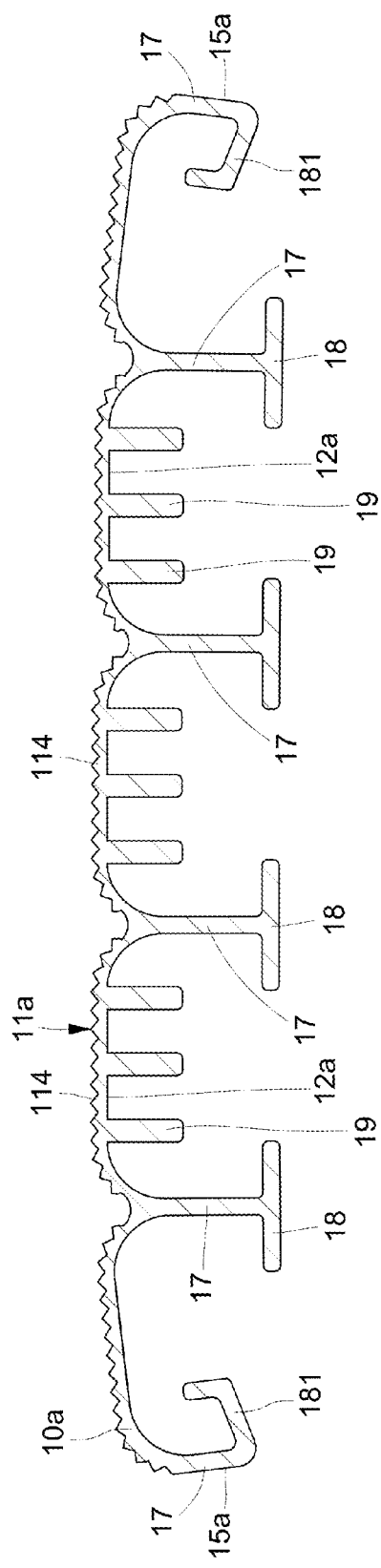
FIG. 38 is a cross sectional view for a serrated surface of the varied upper deck in the second exemplary embodiment of the present invention.

FIG. 37 is a cross sectional view for a serrated surface of the varied upper deck in the first exemplary embodiment of the present invention while FIG. 38 is a cross sectional view for a serrated surface of the varied upper deck in the second exemplary embodiment of the present invention, wherein each top surface 11, 11a of each corresponding upper deck 10, 10a can be varied into serrated surface 114 respectively. With serrated surface 114 for each top surface 11, 11a of each corresponding upper deck 10, 10a of the present invention, even the upper deck 10, 10a of the present invention has same top encompassed area as that for the flat top surface 31 of the conventional upper deck 30, the actual contacting area with dropped shower water for the creased top surface 11 of the present invention is considerably larger than that of the conventional flat top surface 11 for the conventional "heat exchanger for bathing shower" in publishing number of CN102478367 of Chinese Invention Patent so that "recovering rates for the residual heat in spent shower water" η of the present invention is essentially enhanced.

In conclusion all the disclosure heretofore, the simple structure with less fabricating process of the present can definitely reduce the manufacturing cost other than considerably energy-saving effect for the bathing water heater. For efficiency of the thermal energy exchange for bathing shower water, the "recovering rate for the residual heat in spent shower water" η of the present invention achieves over 50% other than that the consumed energy quantity of the electricity or gas for using "thermal energy exchanger for bathing shower water" of the present invention can be doubly reduced comparing to that for using conventional "heat exchanger for bathing shower" in publishing number of CN102478367 of Chinese Invention Patent. Thus, the present invention meets the basic criterion of patentability because it indeed has highly industrial utilization.

What is claimed is:

1. A thermal energy exchanger for bathing shower water comprises a stacked upper deck and a founded lower chassis as well as a front hatch and a rear hatch, wherein said upper deck, which is a planiform cuboid extruded by metal material and encompassed by a creased top surface with certain screw bores suitably located thereon, a bottom surface, a front side, a rear side, a pair of parallel flanks, includes a plurality of parallel septa downwardly disposed on the inner bottom surface, a longitudinal T-shaped docking latch bar being downwardly formed on the terminal of each septum while a longitudinal L-shaped docking latch bar being downwardly formed on the terminal of each flank, a plurality of parallel heat conducting ribs being created between each pair of adjacent septa in inner bottom surface such that the length of the heat conducting rib is shorter than that of the septum; said lower chassis, which is a planiform slab extruded by non-metal material and encompassed by a top surface, a flat sole surface with certain screw bores suitably located thereon, a front side, a rear side, a pair of parallel flanks with same planar shape and area in mating with the upper deck, includes a plurality of longitudinal inverted T-shaped docking latch groove, which are upwardly formed on the top surface in suitable positions corresponding to the longitudinal T-shaped docking latch bars between each pair of adjacent septa on the upper deck, a longitudinal flute on each flank, which is to securely mate with corresponding to the longitudinal L-shaped docking latch bar for each flank on the upper deck, as well as a water intake and a water outtake perforated between the top surface and sole surface; and each hatch, which is a planiform slab with suitable planar shape and area to properly cover the front sides and the rear sides for an interim integral assembly of the upper deck and lower chassis in flush manner, has two rows of certain punched fixing bores disposed thereon in corresponding to the certain screw bores on the upper deck and certain screw bores on the lower chassis so that both of front and rear hatches can hermetically seal both front sides and as well as both rear sides and of the interim integral assembly of the upper deck and lower chassis in plenum manner via screws run through all certain punched fixing bores and corresponding certain screw bores and, and a trough, which combines passages between septa to create a water tunnel of continual zigzag circulating duct among septa therein.

2. The thermal energy exchanger for bathing shower water as claimed in claim 1, wherein both sides of the heat conducting ribs in the inner bottom surface of the upper deck are modified into corrugated surface.

3. The thermal energy exchanger for bathing shower water as claimed in claim 1, wherein a longitudinal extruding wing with two slant inwardly latching ribs in inner bottom surface is disposed at each joint for each flank and top surface in an intermediately altered upper deck, and a longitudinal extruding groove is disposed at right joint for the internal flank and top surface while a tucked skirt is disposed at the left flank in the left laterally altered upper deck; similarly, for a right laterally altered upper deck, wherein a longitudinal extruding groove is disposed at left joint for the internal flank and top surface while a tucked skirt is disposed at the right flank in the right laterally altered upper deck.

4. The thermal energy exchanger for bathing shower water as claimed in claim 1, wherein a longitudinal extruding wing with two slant inwardly latching ribs in inner bottom surface is disposed at left joint for the flank and top surface while a longitudinal extruding groove is disposed at right joint for the flank and top surface in an intermediately adapted upper deck, and a longitudinal extruding grooves is disposed at right joint for the internal flank and top surface while a tucked skirt is disposed at the left flank in left laterally adapted upper deck; conversely, a longitudinal extruding wing with two slant inwardly latching ribs is disposed at left joint for the internal flank and top surface while a tucked skirt is disposed at the right flank in right laterally adapted upper deck.

5. The thermal energy exchanger for bathing shower water as claimed in claim 1, wherein each top surface of each corresponding upper deck is varied into serrated surface respectively.

6. The thermal energy exchanger for bathing shower water as claimed in claim 1, wherein both sides of the heat conducting ribs in the inner bottom surface of the upper deck are modified into serrated surface.

7. A thermal energy exchanger for bathing shower water comprises a stacked upper deck and a founded lower chassis as well as a front hatch and a rear hatch, wherein said upper deck, which is a planiform cuboid extruded by metal material and encompassed by a creased top surface with certain screw bores suitably located thereon, a bottom surface, a front side, a rear side, a pair of parallel flanks, includes a plurality of parallel septa downwardly disposed on the inner bottom surface, a longitudinal T-shaped docking latch bar being downwardly formed on the terminal of each septum while a longitudinal L-shaped docking latch bar being downwardly formed on the terminal of each flank, a plurality of parallel heat conducting ribs being created between each pair of adjacent septa in inner bottom surface such that the length of the heat conducting rib is shorter than that of the septum, besides, each end of the flank in the upper deck is changed into an upwardly tucked skirt; said lower chassis, which is a planiform slab extruded by non-metal material and encompassed by a top surface, a flat sole surface with certain screw bores suitably located thereon, a front side, a rear side, a pair of parallel flanks with same planar shape and area in mating with the upper deck, includes a plurality of longitudinal inverted T-shaped docking latch groove, which are upwardly formed on the top surface in suitable positions corresponding to the longitudinal T-shaped docking latch bars between each pair of adjacent septa on the upper deck, a longitudinal flute on each flank, which is to securely mate with corresponding to the longitudinal L-shaped docking latch bar for each flank on the upper deck, as well as a water intake and a water outtake perforated between the top surface and sole surface, besides, each of flank in the lower chassis is changed into raised bar with an inwardly tucked flute so that the latching strength between the lower chassis and upper deck is substantially enhanced via snugly mating between each tucked flute in the flank of the lower chassis and each corresponding tucked skirt in the flank of the upper deck; and each hatch, which is a planiform slab with suitable planar shape and area to properly cover the front sides and the rear sides for an interim integral assembly of the upper deck and lower chassis in flush manner, has two rows of certain punched fixing bores disposed thereon in corresponding to the certain screw bores on the upper deck and certain screw bores on the lower chassis so that both of front and rear hatches can hermetically seal both front sides and as well as both rear sides and of the interim integral assembly of the upper deck and lower chassis in plenum manner via screws run through all certain punched fixing bores and corresponding certain screw bores and, and a trough, which combines passages between septa to create a water tunnel of continual zigzag circulating duct among septa therein.

8. The thermal energy exchanger for bathing shower water as claimed in claim 7, wherein both sides of the heat conducting ribs in the inner bottom surface of the upper deck are modified into corrugated surface.

9. The thermal energy exchanger for bathing shower water as claimed in claim 7, wherein a longitudinal extruding wing with two slant inwardly latching ribs in inner bottom surface is disposed at each joint for each flank and top surface in an intermediately altered upper deck, and a longitudinal extruding groove is disposed at right joint for the internal flank and top surface while a tucked skirt is disposed at the left flank in the left laterally altered upper deck; similarly, for a right laterally altered upper deck, wherein a longitudinal extruding groove is disposed at left joint for the internal flank and top surface while a tucked skirt is disposed at the right flank in the right laterally altered upper deck.

10. The thermal energy exchanger for bathing shower water as claimed in claim 7, wherein a longitudinal extruding wing with two slant inwardly latching ribs in inner bottom surface is disposed at left joint for the flank and top surface while a longitudinal extruding groove is disposed at right joint for the flank and top surface in an intermediately adapted upper deck, and a longitudinal extruding grooves is disposed at right joint for the internal flank and top surface while a tucked skirt is disposed at the left flank in left laterally adapted upper deck; conversely, a longitudinal extruding wing with two slant inwardly latching ribs is disposed at left joint for the internal flank and top surface while a tucked skirt is disposed at the right flank in right laterally adapted upper deck.

11. The thermal energy exchanger for bathing shower water as claimed in claim 7, wherein each top surface of each corresponding upper deck is varied into serrated surface respectively.

12. The thermal energy exchanger for bathing shower water as claimed in claim 7, wherein both sides of the heat conducting ribs in the inner bottom surface of the upper deck are modified into serrated surface.

* * * * *